W. WRIGHT & G. O. DEGENER.
COMBINED TYPE WRITING AND COMPUTING MACHINE.
APPLICATION FILED FEB. 12, 1910.
1,237,008.
Patented Aug. 14, 1917.
11 SHEETS—SHEET 2.
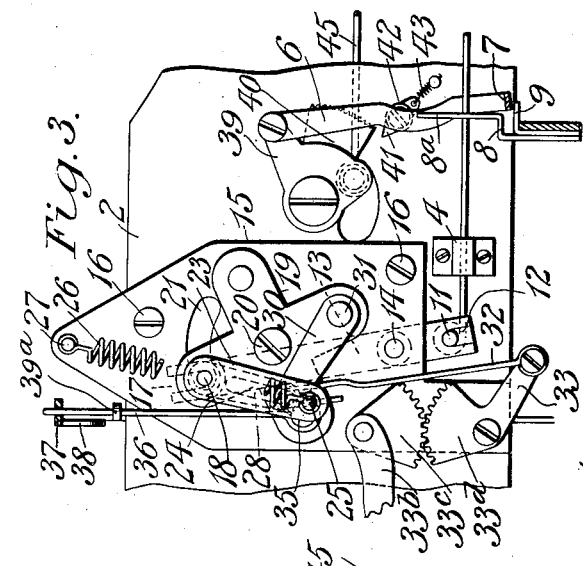
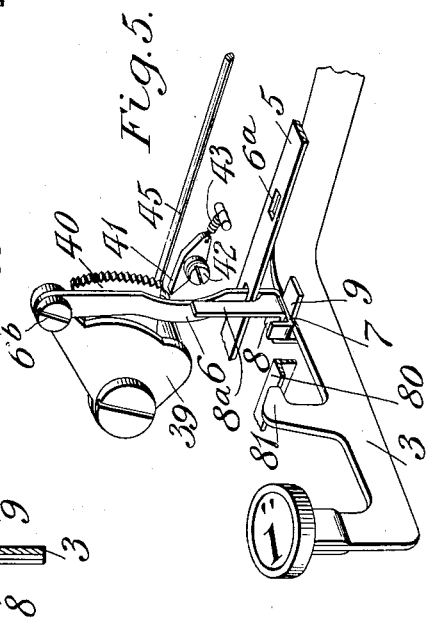
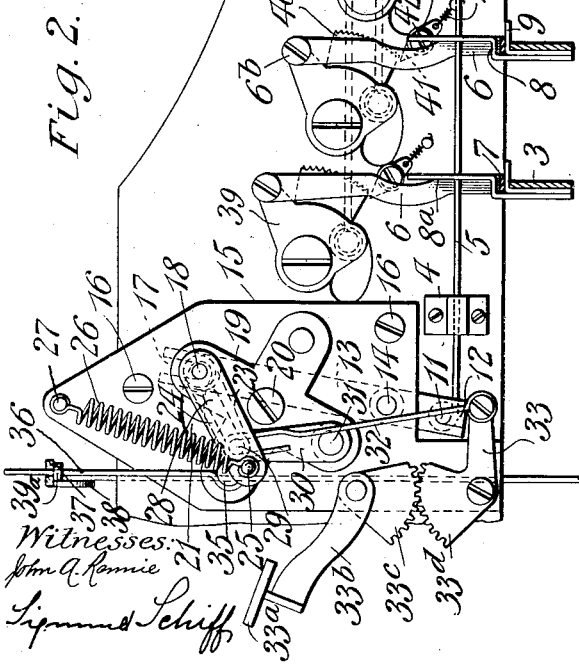
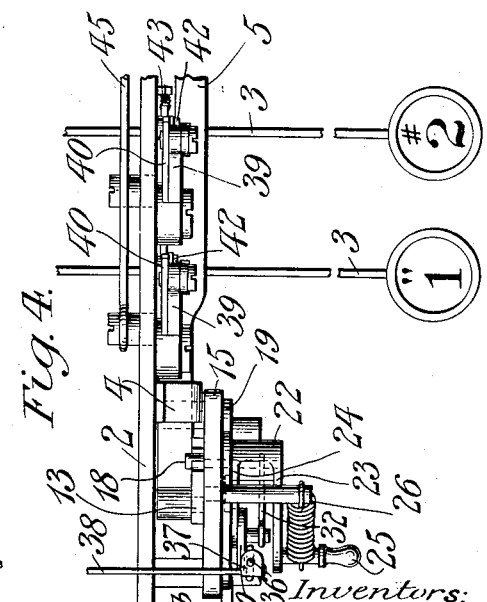
Witnesses:
John A. Rennie
Sigmund Schiff
Inventors:
Walter Wright
and Gustave O. Degener
By B. C. Stickney
Attorney.

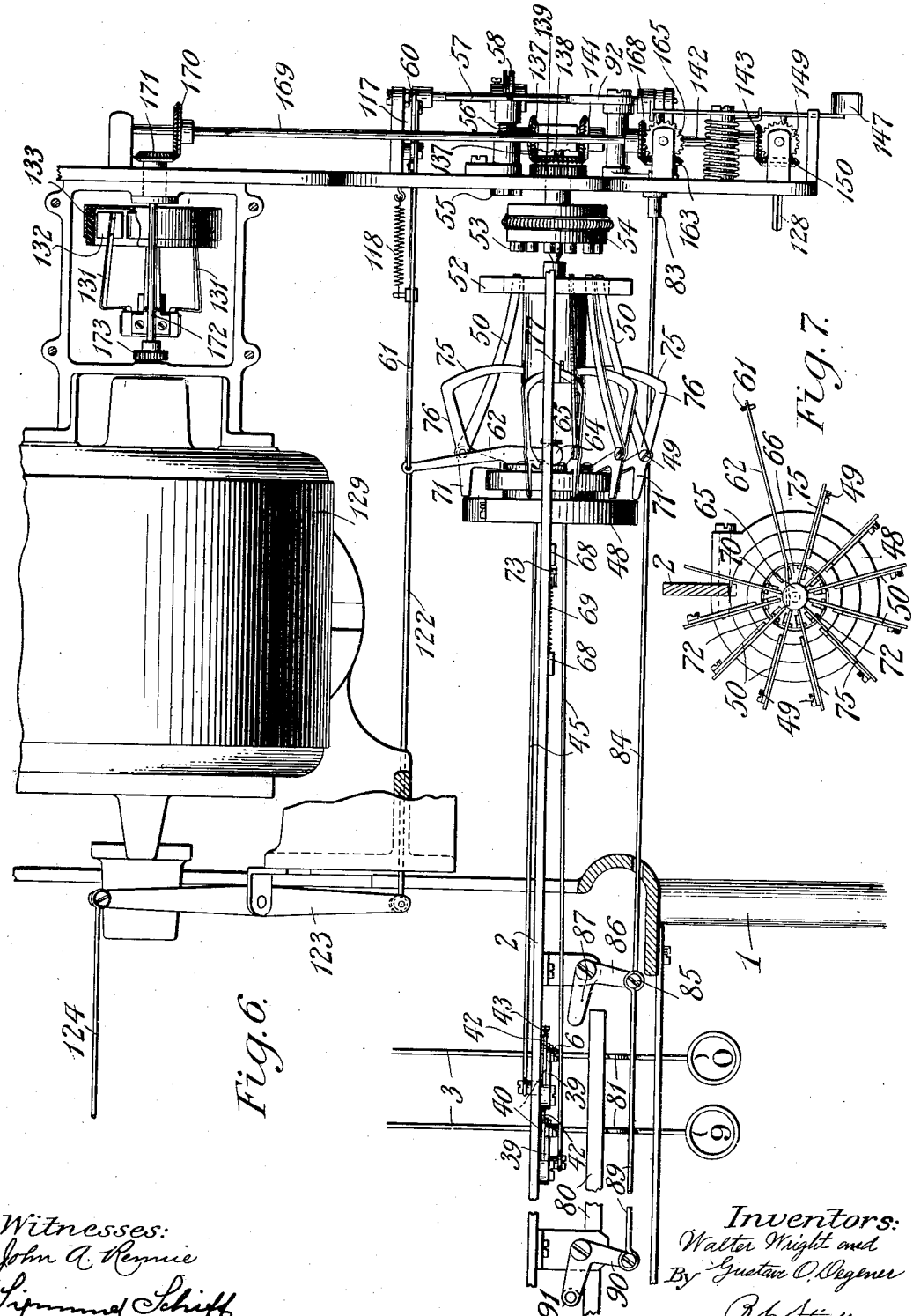

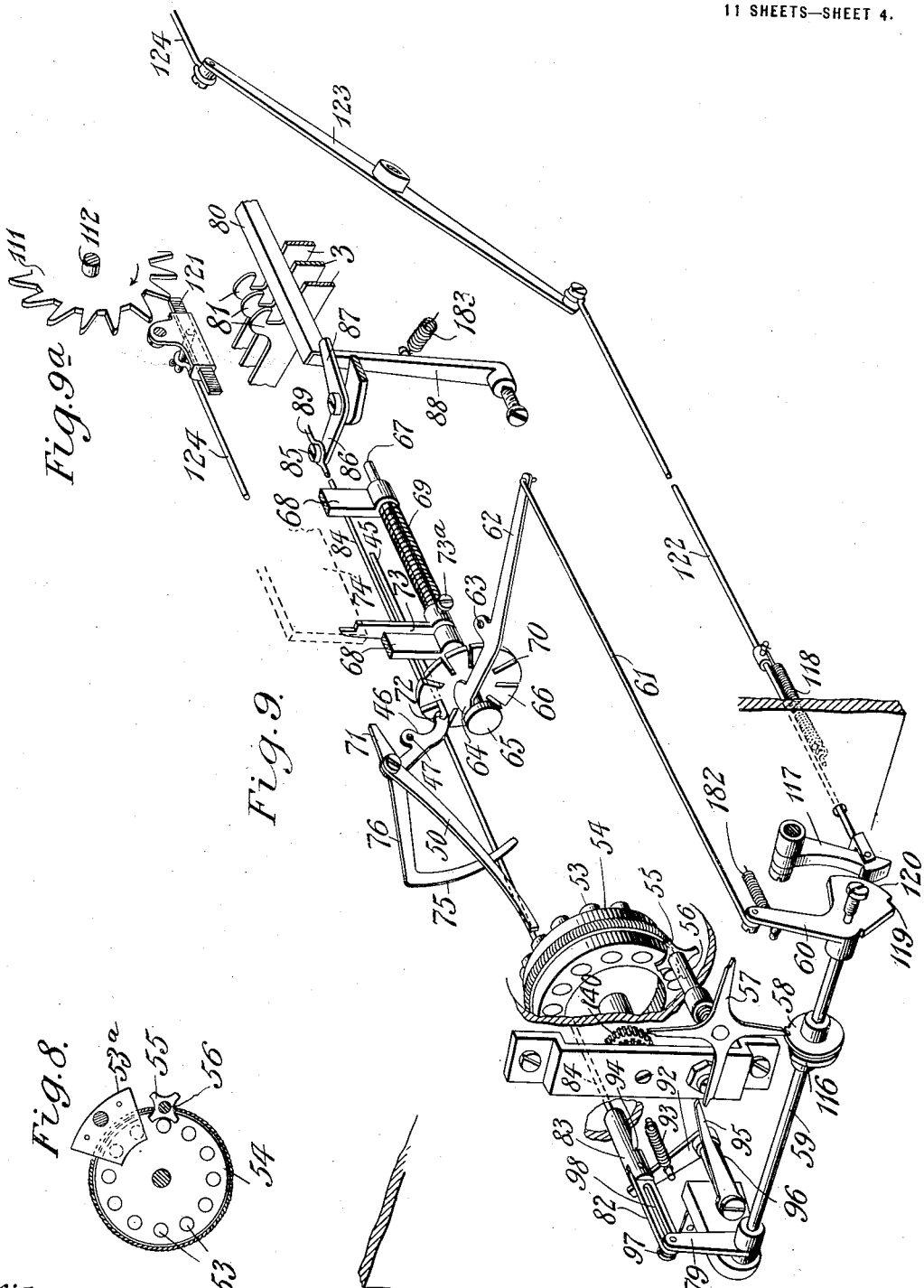

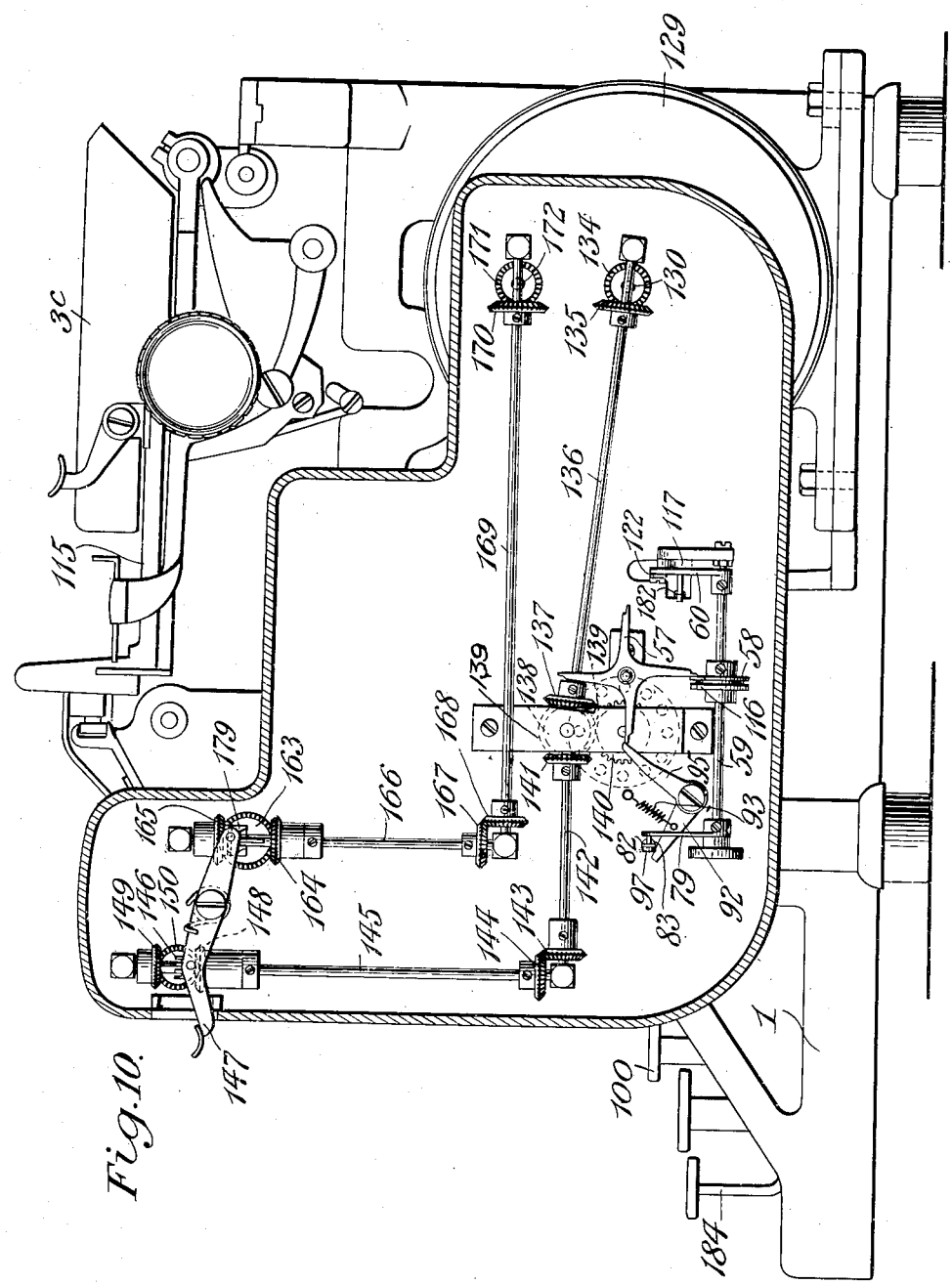

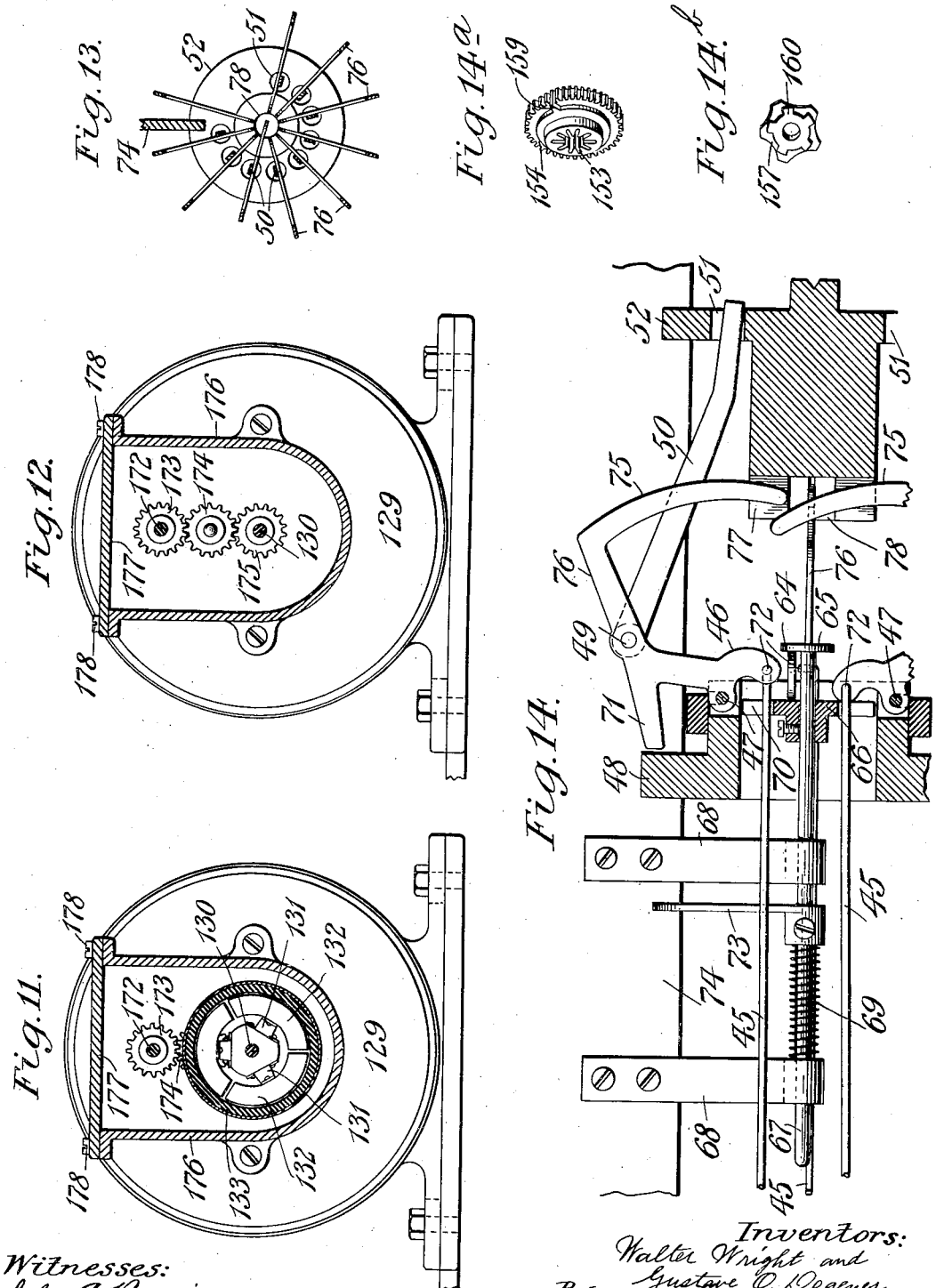

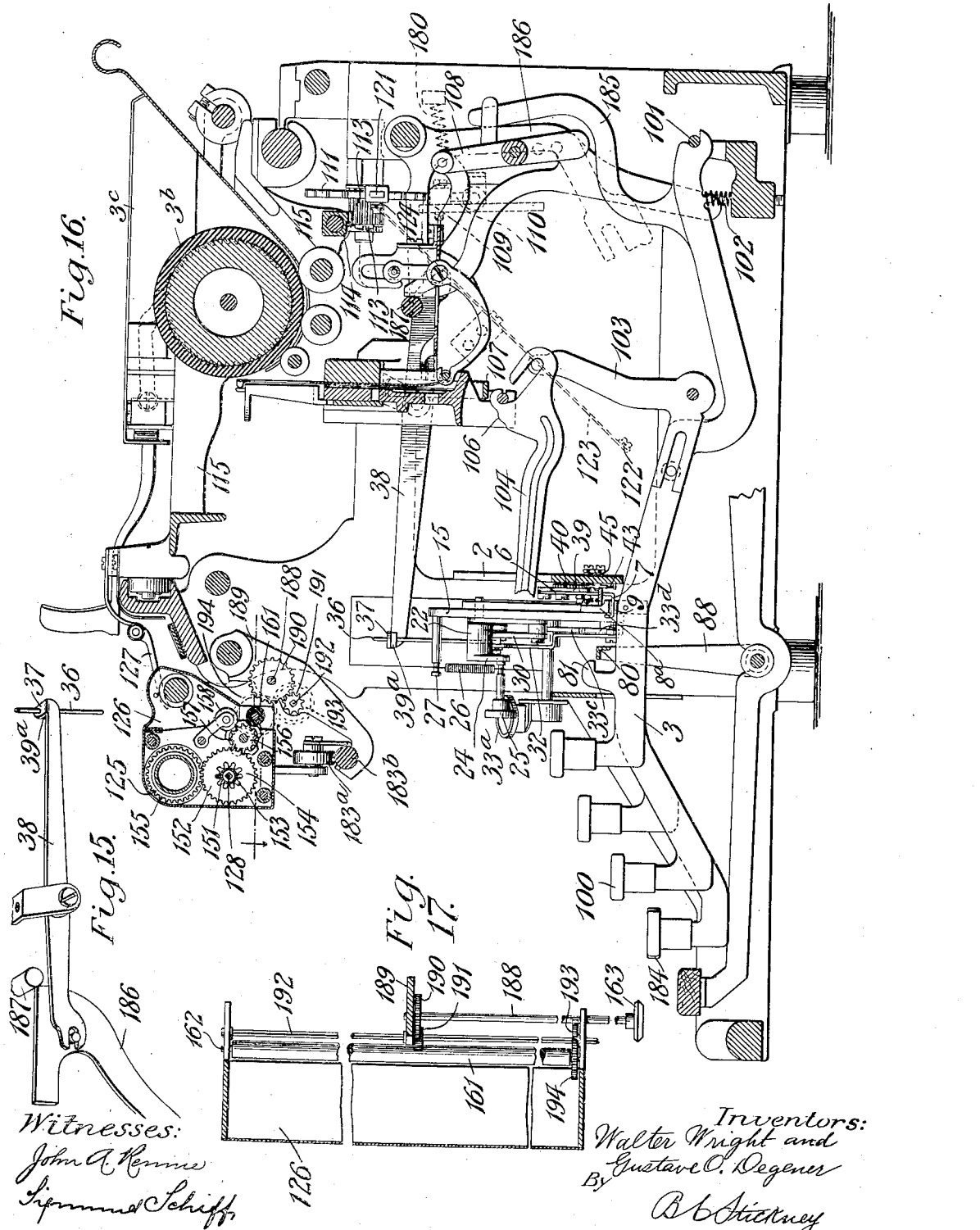

W. WRIGHT & G. O. DEGENER.
COMBINED TYPE WRITING AND COMPUTING MACHINE.
APPLICATION FILED FEB. 12, 1910.
1,237,008.
Patented Aug. 14, 1917.
11 SHEETS—SHEET 8.
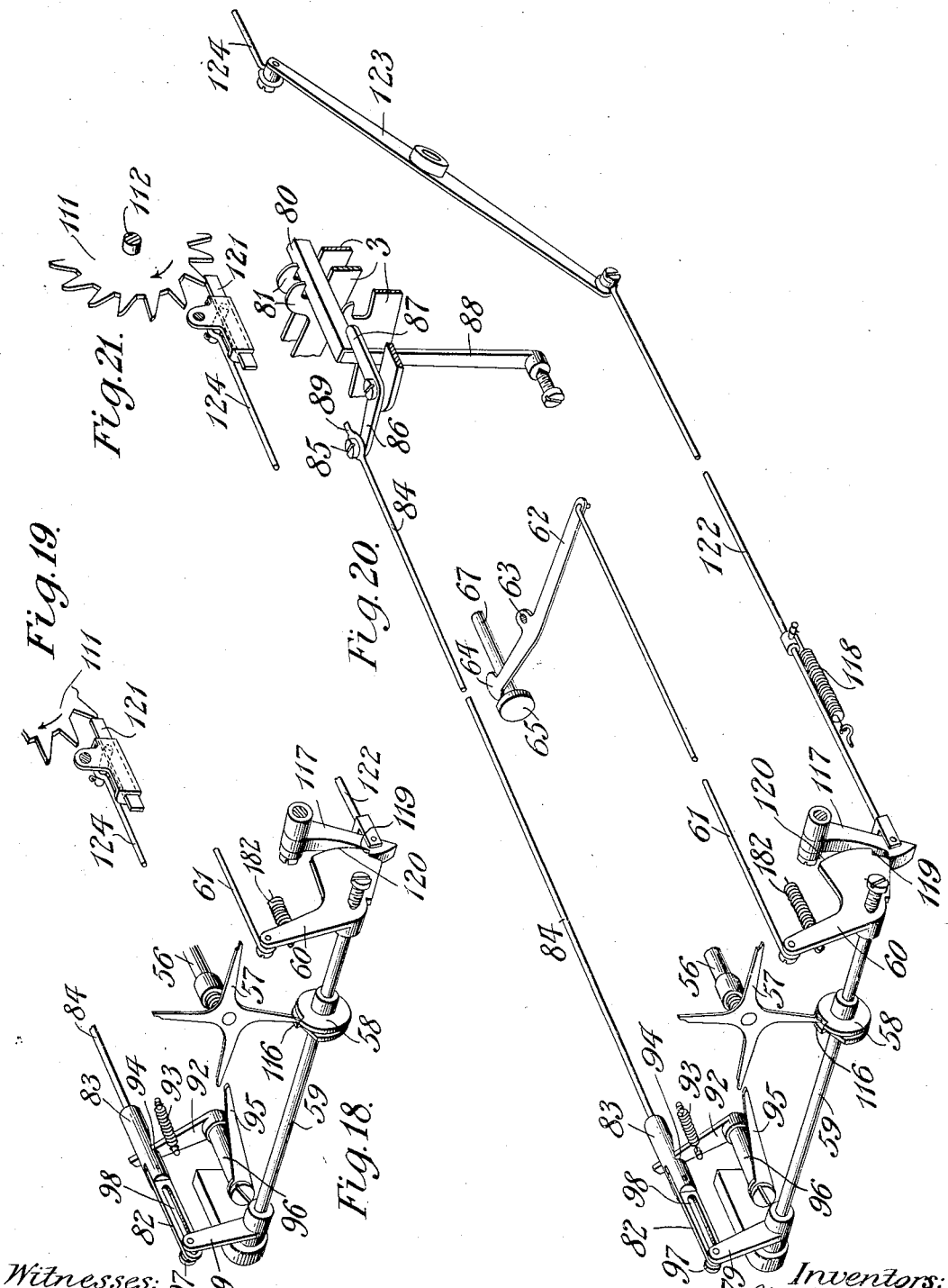

W. WRIGHT & G. O. DEGENER.
COMBINED TYPE WRITING AND COMPUTING MACHINE.
APPLICATION FILED FEB. 12, 1910.

1,237,008.

Patented Aug. 14, 1917.
11 SHEETS—SHEET 9.

WITNESSES:
F. E. Alexander
Lorenz L. Pritzl

INVENTORS:
Walter Wright and
Gustave O. Degener
BY
B. C. Stickney
ATTORNEY

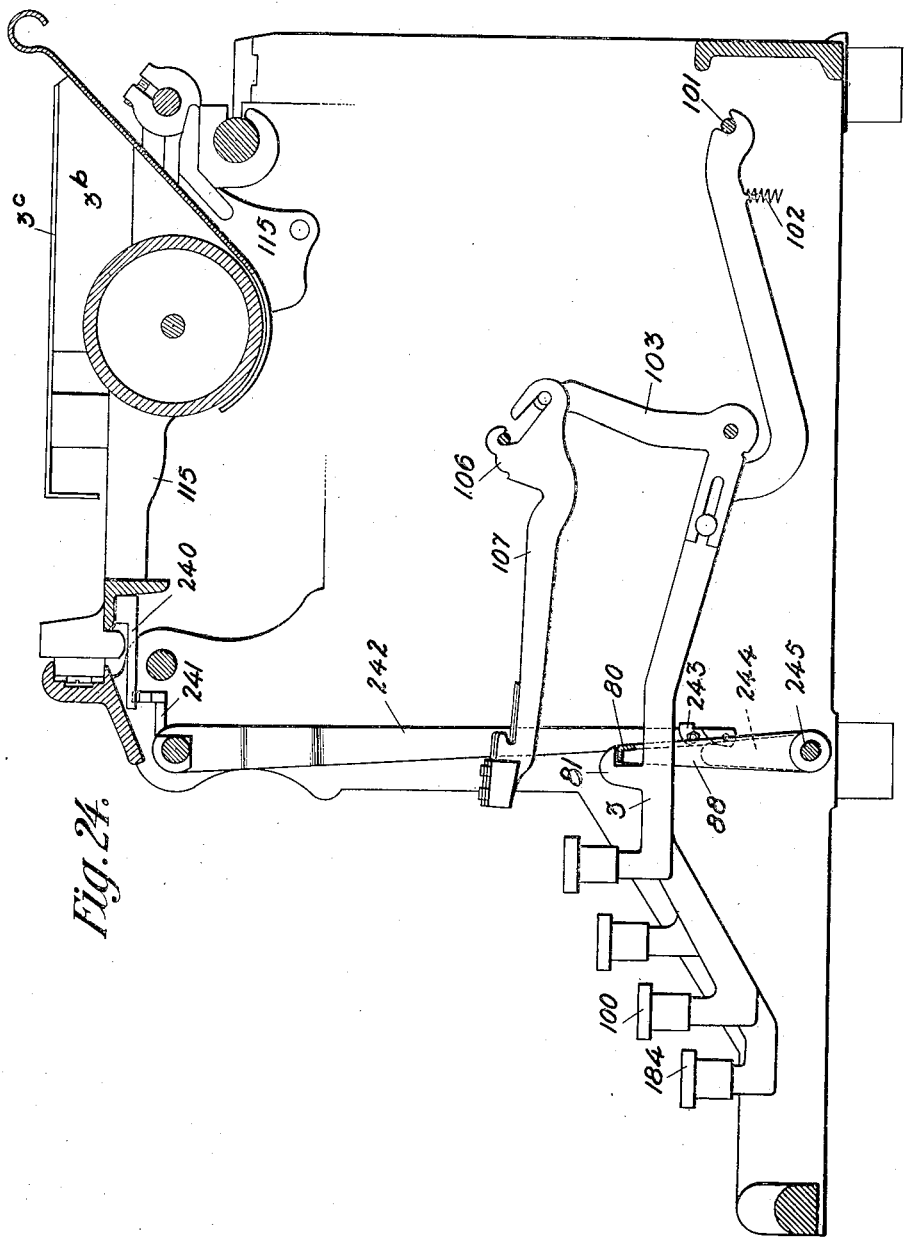

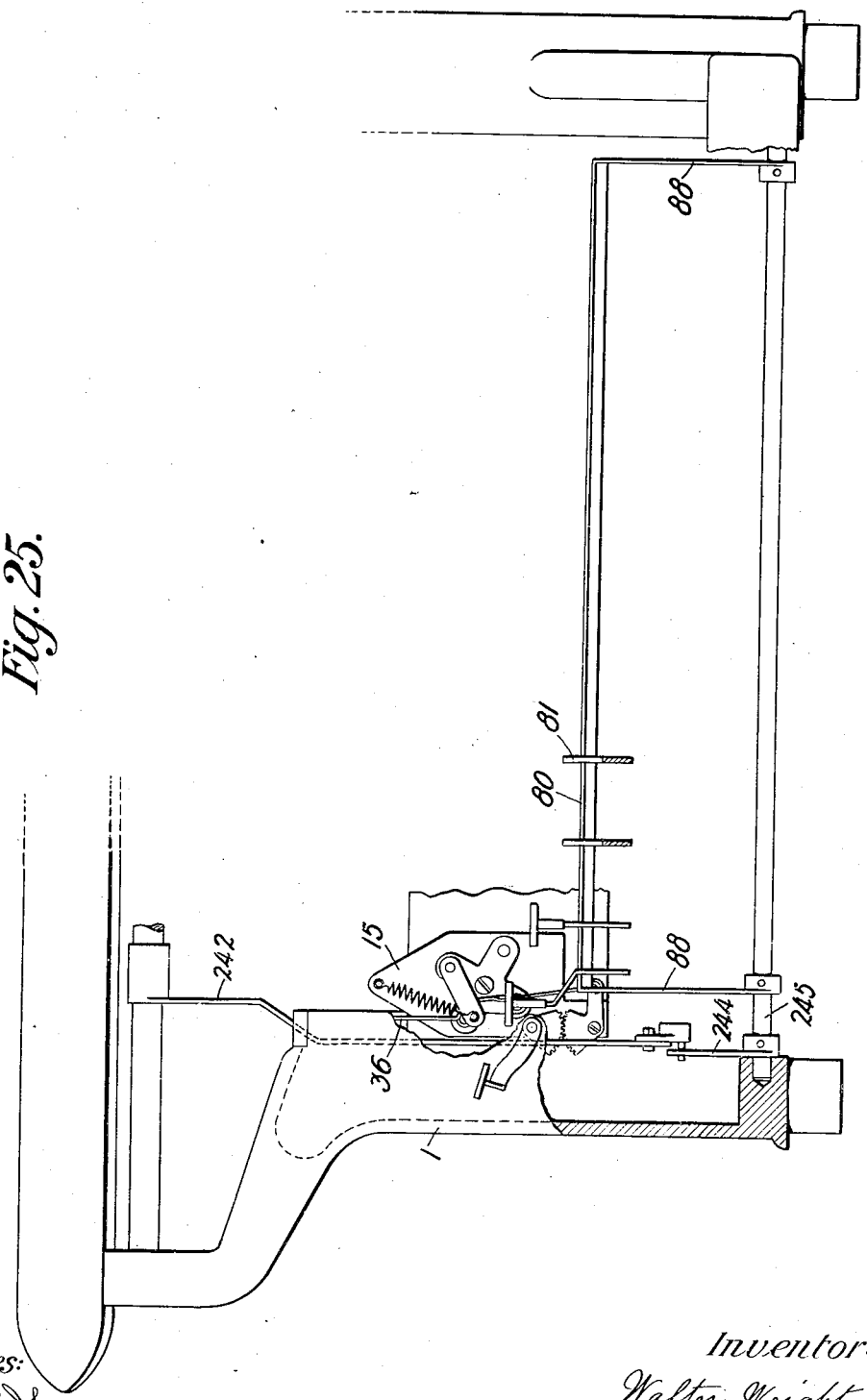

UNITED STATES PATENT OFFICE.

WALTER WRIGHT AND GUSTAVE O. DEGENER, OF NEW YORK, N. Y., ASSIGNORS TO UNDERWOOD COMPUTING MACHINE COMPANY, OF NEW YORK, N. Y., A CORPORATION OF NEW YORK.

COMBINED TYPE-WRITING AND COMPUTING MACHINE.

1,237,008.     Specification of Letters Patent.     Patented Aug. 14, 1917.

Application filed February 12, 1910. Serial No. 543,603.

*To all whom it may concern:*

Be it known that we, WALTER WRIGHT and GUSTAVE O. DEGENER, both citizens of the United States, and both residing in the city, county, and State of New York, have invented certain new and useful Improvements in Combined Type-Writing and Computing Machines, of which the following is a specification.

This invention relates to combined adding and typewriting machines, particularly those in which the adding wheels are power driven and controlled by means of an escapement wheel, the latter in turn being under control of the numeral keys of the typewriter.

One of the objects of the present invention is to improve the means for releasably connecting the typewriter keys to the computing mechanism, with a view to insuring the prompt reëngagement of the connecting parts when desired, without liability of disarrangement of any part. To this end, the connections from the keys to the computing mechanism include a set of hooks which are connected to the keys in a manner to permit them to be simultaneously released, and each key has suitable guards, to prevent accidental displacement or disarrangement of the hooks when the latter are released and the keys put in operation for typewriting alone.

Another object of the invention is to provide a checking mechanism to prevent premature reversal of the movement of any key, so constructed that it will not prove an objection when typewriting alone is being done. To this end, the checking devices are silenced whenever the keys are disconnected from the computing mechanism.

This result is preferably accomplished by constructing checking devices between the releasable hooks and the escapement wheel of the adding mechanism, so that the checking devices and adding devices will be simultaneously disconnected from the keys.

Another object of the invention is to provide simple and effective means for preventing simultaneous depression of two numeral keys. To this end, the keys are connected to a converging series of blades, which may be moved by the keys to occupy a common position. The blades are shown converging about a common center. Each key may move its blade to said common center at the initial part of the key depression. If another key is operated, its blade will strike the first operated blade. In other words, each blade interferes with the operation of all the others, and hence the depression of more than one key at a time is prevented.

It will also be understood that the blade of the operated key prevents the operation of any key until the first key is returned to normal position. These interfering blades are also releasable from the keys simultaneously with the adding devices.

It will be seen from the foregoing that each key not only interferes with the operation of the others, but cannot release the others until it is itself first fully depressed, and then restored to normal position.

Another object of the invention is to provide means to prevent the operation of any key before the escapement wheel has moved to the position determined by the last operated key, so as to prevent premature feeding of the paper-carriage, that is, to prevent the paper-carriage from being released or from starting to move while the master-wheel is operating a computing wheel.

In the preferred manner of carrying out this part of the invention, a universal locking bar is employed to lock all the keys in the typewriter; this locking bar being substantially the same thing as the line-locking bar usually employed in an Underwood typewriter, and being in fact employed also for line-locking in the usual manner. The depression of any of the numeral keys operates to set this locking bar to position to lock all the keys in the typewriter; and a latch holds the locking bar in effective position. The depressed key operates in the usual manner to release the carriage for letter-feeding, and also operates to release the escapement wheel of the computing mechanism, so that the latter may be driven around through an arc determined by the key depressed, and the master wheel turned accordingly. As the master wheel is coming to rest, it releases the latch that detains the locking bar, and the latter is returned to normal position by a spring. The movement of the locking-bar back to normal position leaves the way clear for the depressed key to complete its return to normal position, and also to release the other numeral keys from the control of the interfering blade. It will be borne in mind that reactuation of said depressed key cannot take place before it completes its return to normal position, owing to the provision of the checking mechanism above referred to.

From the foregoing, it will be understood that only one numeral key can be depressed at a time, and that it is otherwise rendered impossible for any escapement pin on said escapement wheel to be prematurely or falsely projected to working position; and also that the carriage-feeding mechanism cannot be prematurely operated by any key of the machine during the operation of the adding mechanism caused by a previously depressed key.

A further object of the invention is to improve the gearing connections between the constantly revolving motor and the computing mechanism. Two trains of gearing ramify from the motor, one train extending to the master wheel of the adding mechanism and the other train extending to the constantly revolving shaft which assists at the tens-carrying operation. The clutch between the motor shaft and the main train of gearing is contained in a box. The latter also contains certain gears of the second train, and is designed for containing lubricant or the like.

Other features and advantages will hereinafter appear.

In the accompanying drawings,

Fig. 2 is a front view on a larger scale, to show the means for disconnecting the keys from the adding mechanism, and also the devices for checking the keys against premature reversal of movement.

Fig. 3 is a similar view showing the keys disconnected by the depression of the temporary disconnecting key.

Fig. 4 is a plan of parts seen in Fig. 2.

Fig. 5 is a perspective view of parts seen in Fig. 2.

Fig. 6 is a part sectional plan view of the principal members of the computing mechanism; the computing wheels and carriages being omitted.

Fig. 7 is an elevation of radially disposed jacks and the levers upon which they are mounted and by which they are caused to project or set the escapement pins upon the primary or main escapement wheel.

Fig. 8 is a sectional elevation showing the pins in the primary escapement wheel and the four-toothed rotatable dog or pinion driven thereby.

Fig. 9 is a perspective view of the principal members of the mechanism for enabling the keys to control the movements of the primary escapement wheel of the computing mechanism, and also several safety devices associated therewith.

Fig. 9ᵃ is to be read as a part of Fig. 9.

Fig. 10 is a part sectional elevation taken from front to rear, showing connections between the motor and the computing wheel shafts and the escapement mechanism for the computing wheels.

Fig. 11 is a sectional view taken through a lubricant box which contains a friction clutch between the motor and the computing mechanism, and also part of the train of gears running to the constantly rotating shaft which assists at the tens-carrying operation. This section is taken through the clutch.

Fig. 12 is a sectional view similar to Fig. 11 but taken at another part of the box.

Fig. 13 is a sectional elevation to illustrate the operation of the devices which enable each numeral key to interfere with the operation of all the others.

Fig. 14 is a front sectional elevation of a portion of the machine at the right of Fig. 3, and illustrating certain key-controlled devices, including the jacks for setting the escapement pins, and also the interfering blades which enable each numeral key to prevent the operation of the others. Figs. 14ᵃ and 14ᵇ show tens-carrying elements.

Fig. 15 is a detail of the connection between the platen-shifting frame of the typewriter and the disconnectible devices which extend from the keys to the adding devices; whereby at the shifting of said frame in one direction the keys are disconnected from the adding devices, and the connection is restored at the return movement of said shifting frame to normal position.

Fig. 16 is a sectional elevation taken longitudinally from front to rear of the combined typewriting and adding machine, taken about centrally of the machine.

Fig. 17 is a detail of the gear connections associated with the computing wheel carriage.

Fig. 18 is a perspective view illustrating the secondary escapement wheel as temporarily locked to prevent the main or primary escapement wheel from rotating while the paper carriage is making its letter feeding movement.

Fig. 19 is to be read in connection with Fig. 18.

Fig. 20 is a perspective view to show positions of the parts at the completion of a printing stroke of a numeral key in the typewriter.

Fig. 21 is to be read in connection with Fig. 20.

Figure 22:
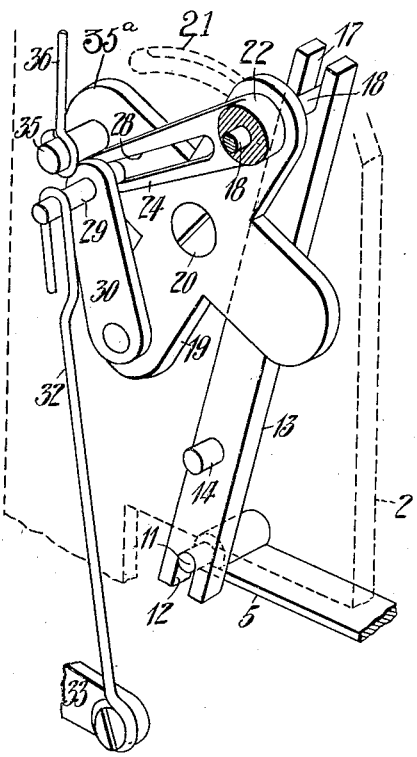

Fig. 22 is an enlarged perspective view of the controlling mechanism for governing the connection of the numeral keys to the computing mechanism.

Figure 23:
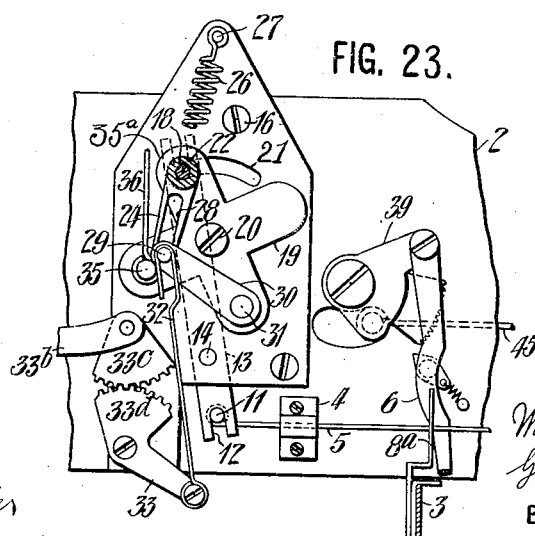

Fig. 23 is a front view in elevation of the parts shown in Fig. 22 with parts broken away to show the underlying structure.

Fig. 24 is a vertical section taken from front to rear, showing the relation of the line-lock mechanism to the carriage. The locking bar of this mechanism is also used for locking the keys when a computing action has been started and before the same is completed.

Fig. 25 is a front view of the forward part of the machine, showing the line-locking device usual on the Underwood machine, which is disclosed in the Helmond Patent 775,331; and also showing a portion of the mechanism for connecting and disconnecting the computing devices from the numeral keys.

Figure 1:
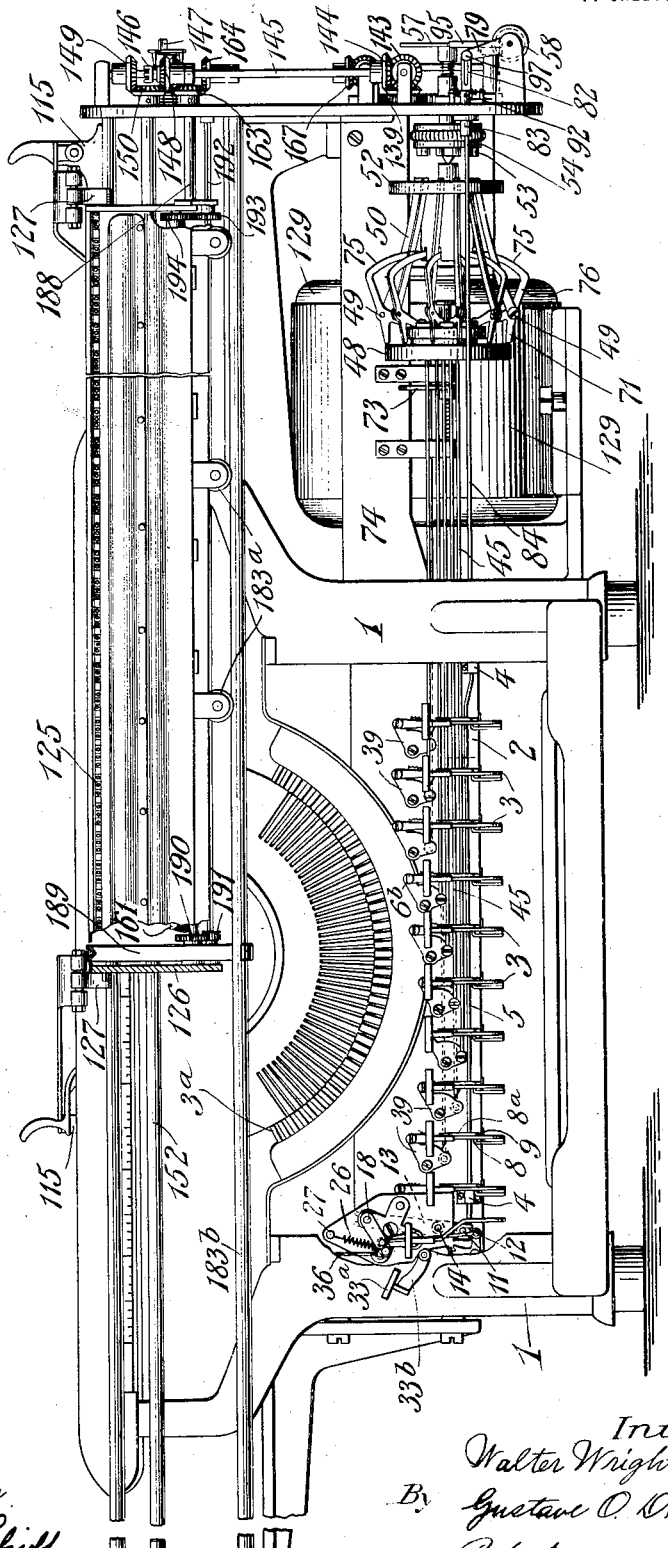
Figure 1 is a front view of the present improvements applied to the Underwood front strike writing machine; the parts being shown in normal positions ready to begin a line of writing and adding.

*Releasable connection of numeral keys to the adding mechanism; platen shifting devices.*—Fixed to the forward portion of the frame 1 of the Underwood typewriting machine illustrated, is a transverse plate 2, Figs. 1, 3 and 16 on edge, overlying the key-levers 3, which operate the figure and letter types 3ª, causing them to strike rearwardly against the platen 3ᵇ journaled upon a platen frame 3ᶜ, which is vertically shiftable, as usual, for writing either capitals or small letters at will.

Secured upon the front side of said fixed plate 2 are guides 4 for a transverse horizontal sliding-bar 5, Fig. 2 which is employed for the purpose of connecting and disconnecting the adding mechanism from the type-operating key-levers 3. Links 6, Figs. 2 and 5, are passed through holes 6ª in said disconnecting bar 5, and are connected at their lower ends by hooks 7 to said key levers 3, and at their upper ends by pivots 6ᵇ to bell-cranks, which will presently be described, for controlling the adding devices.

As seen at Figs. 2 and 5, the hooks 7 of the links 6, are normally caught between upper and lower horizontal jaws 8, 9, provided upon the numeral key-levers 3, so that when any numeral key lever is depressed, the link 6 is pulled down and the adding devices operated. By sliding the disconnecting-bar 5 to the right, the links 6 are swung free of said jaws, and the numeral keys may be depressed to cause their types to print, without adding, Fig. 3.

It will be observed that the lower jaw 9 is extended to the right, Fig. 3, far enough to serve as a guard to prevent the hook 7 from getting below the jaw 9 even when the hook is swung clear of the upper jaw 8; and the latter is provided with a vertical extension 8ª of a height to correspond with the length of stroke of the key-lever 3, so that the hook 7 cannot be swung to the left over the jaw 8. Therefore, all danger of disarrangement or improper relation between the links and the levers is avoided.

The disconnecting-bar 5 may be operated in any suitable manner, as for instance in that shown in application No. 485,030, filed March 22, 1909, whereby said disconnecting-bar 5 is connected to the mechanism that shifts the platen frame up and down, so that no addition may be performed when the keys 3 are being used for writing upper case letters and not figures.

As set forth in said application, said bar 5 has a pin or pivot 11, engaging a slot 12 in the lower end of the upstanding lever 13, which is pivoted between its ends at 14 upon a fixed support 15 forward of and separated from the fixed plate 2 and secured thereto by suitable devices 16. It will be seen that by swinging the lever 13 to and fro, the bar 5 connected thereto may be caused to disengage and reëngage the adding links 6 to the type-operating key-levers 3. As explained in said application, a slot 17 in the upper end of the lever 13 is engaged by a pin or pivot 18 extending from the upper end of the uppermost arm of a four-armed lever 19, which turns upon a central pivot 20 provided upon the support 15. The pin 18 projects through an opening 21 in said support 15, on the back side of which the lever 13 is pivoted. The movements of the switch-lever 19 are arrested by the engagement of said pin 18 with the ends of said opening or slot 21. Upon said pin 18 is loosely pivoted, by means of a hub 22, a crank or arm 23 carrying a handle 25. To the latter is attached the lower end of a draw-spring 26, the upper end thereof being caught upon a fixed pin 27. Said spring holds an arm 24 (also provided upon the hub 22, Fig. 4,) up against a pin 35 projecting from the left hand cross-arm of the lever 19, and thereby holds said lever 19 in the Fig. 2 position, and the disconnecting-bar 5 in position to hold the links 6 in operative engagement with the key-levers 3.

For temporarily disconnecting the adding mechanism from the keys, a key 33ª is provided upon a lever 33ᵇ, Fig. 2, the latter having a segment 33ᶜ, to mesh with a segment 33ᵈ provided upon lever 33, whereby upon depression of the key the lever 33 is carried down, and by means of a link 32 pulls down upon the pin 29, to which its upper end is pivoted, and thereby swings the four-armed lever 19 from the position at Fig. 2 to that at Fig. 3, against the tension of the spring 26. Upon the release of the key 33ᵃ from pressure, said spring restores the parts to initial positions.

During the operation just described, the pin 29 moves in an arc about the pivot 20 as if said pin 29 were fixed to the four-armed lever 19; but it will be seen that said pin is provided upon a link 30, which is pivoted at its lower end at 31 to the lowermost arm of said four-armed lever, and that said pin 29 works in a slot 28 in said arm 24, for the purposes set forth in said application.

To said pin 35 is pivoted the lower end of a vertical rod or link 36 carrying a lug 39ᵃ, Figs. 2 and 16, which may be pressed down by the end 37 of a lever 38, which is connected to the frame 186 for the shifting platen frame 3ᶜ in such a manner that said lever 38 may press down the link 36 from the position at Fig. 2 to that at Fig. 3, whenever the platen frame is shifted up for writing capitals, so that at this time no adding shall be effected. As set forth in said application, upon swinging the handle 25 to the right, the spring 26 is carried over the dead-center, and accordingly serves to hold the four-armed lever 19 permanently in the position at Fig. 3. At such time, the key 33ᵃ will serve to return the four-armed shift lever 19 temporarily to the Fig. 2 position.

*Double acting key check.*—When any figure key 3 is depressed, the jaw 8 connected thereto pulls down the hook 7 and its link 6, and rocks the bell crank 39 to which said link is pivoted at its upper end, Fig. 2. It will be observed that the bell cranks 39 are pivoted upon the front side of the plate 2. Upon each bell crank is fixed a segment 40 of a ratchet; and each segment is engageable by a double-acting pawl 41 pivoted at 42 upon the front of said fixed plate 2. Each pawl is vibratable to either side of its normal position; and is held in normal position by a draw-spring 43 connected to the end of the pawl opposite its point. During the descent of a key, the pawl engages the segment 40, riding freely over the teeth thereof, but preventing return of the segment or key, as seen at the right hand portion of Fig. 2. As soon, however, as the depression of the key is completed, the pawl slips off the right hand or upper end of the segment, the spring 43 returning it to normal condition, and the return of the key is permitted under the influence of its spring 102. During such return stroke, the upper end of the segment engages the pawl 41 and turns it backwardly and rides up freely past the same; said pawl now serving to prevent a second depression of the same key before the return stroke of said key is completed. Upon the key resuming its normal condition, the pawl 41 again swings clear of the segment, and spring 43 returns the pawl to normal position. Movement of bar 5 to the right of course disconnects the keys from the key checking devices.

*Key operated mechanism for setting the escapement pins, and mechanism for controlling the rotation of the adding wheels.*—To each of the bell cranks 39 is pivoted at the left hand end a long link 45, which extends horizontally to the right, Fig. 1, past the general framework of the typewriter, and its right hand end is pivoted to a lever 46, Fig. 14. These levers 46 are disposed radially and suitably fulcrumed at 47 upon an annular fixture 48. To each lever is pivoted at 49 one end of a jack 50; the other end being loosely guided in a perforation 51 in a fixed disk 52, Fig. 14.

Whenever a key is depressed and its bell-crank 39 is turned, the associated lever 46 is actuated by the link 45 to thrust the jack 50 to the right and cause it to project one of a series of movable stop teeth or pins 53 carried upon an escapement-wheel 54, Figs. 6 and 9 which controls the movements of the adding wheels. The connection of this escapement-wheel to the adding wheels will be presently explained, as will also the connection to the motor by which it is driven forward. The general construction of this escapement-wheel and its pins is set forth in pending application No. 388,766, Figs. 8, 9 and 11. The jacks are disposed in a circle to correspond with the circular arrangement of the escapement pins 53, (returnable by a cam 53ᵃ) and when any jack is advanced, it pushes the adjacent pin through the wheel, so that it protrudes upon the right hand side thereof in position to engage (or drive) a rotary four-toothed dog 55, which is fixed upon the same shaft 56 as the four-toothed secondary escapement-wheel 57. The latter is arrested by a vibrating dog 58, and thus the escapement wheel 54 is held in check. Whenever the dog 58 vibrates to release the escapement wheel 57, the four-toothed dog 55 is rotated by the projecting pin 53 with which it is in engagement, and permits the pin-wheel 54 to rotate until the last projected pin thereon engages with said four toothed dog 55, and rotates the latter until the succeeding tooth of the escapement wheel 57 engages the vibrating-dog 58. The adding wheel which is at the time connected to the escapement-wheel 54, is given a corresponding degree of rotation. When another pin 53 is protruded and the dog 58 is then vibrated, there is a further action of the wheel 54, dependent upon the distance of the last projected pin 53 from the pin which was projected therebefore. Accordingly, any amount of rotation can be given to an adding wheel by depressing the proper key 3 of the series.

It will be observed that said vibrating dog 58 is fixed upon a rock-shaft 59, the latter having an upstanding arm 60 for rocking said shaft; and that said arm 60 is connected by a link 61 to one end of a lever 62, which is pivoted between its ends upon the framework, as at 63, and at its other end carries a head 64, Fig. 6, which fits loosely between a small collar 65 and a large collar or disk 66, both fixed upon an endwise movable guide rod 67, and the latter working in hangers 68. Any of the levers 46 may engage the disk 66 to move it, and thus operate the lever 62 and the dog 58; and a spring 69 will return these parts to normal positions upon relief of the key from pressure. The disk 66 is provided with radial slots 70 in which the links 45 play; and the inner end of each lever 46 may bear directly upon the universal disk or bar 66.

Thus it will be seen that a complete vibration of the dog 58 occurs at each depression and release of any finger-key 3, and hence that the primary escapement wheel 54 is permitted to advance a distance dependent upon the key depressed. Each lever 46 may have a heel 71 to coöperate with the fixed disk 48, to prevent overthrow of the lever upon return to normal position. When the keys are disconnected from the adding mechanism by swinging the links 6, the spring 69, acting upon the universal bar or disk 66, holds the levers 46 in normal positions, and consequently retains the links 6 at the proper height to be again swung into connection with the keys 3.

Each link 45 has on its end a crook, or is bent at right angles, as at 72, to slip through a perforation of the lever 46. An arm 73, Fig. 9, releasably fixed upon the rod 67 by means of a screw 73ª, prevents rotation of the rod 67 or of the disk 66 thereon; said arm 73 being confined between a bar 74 (forming part of the framework attached to the typewriting machine, and carrying the hangers 68) and one of the links 45. When it is desired to turn the disk 66, the screw 73ª is unscrewed to release the rod and disk. The latter may be turned to carry the crooks 72 out of engagement with the levers 4, when disassembling the mechanism.

It will be observed among other things that the pawl 41 and ratchet 40 make it impossible for the operator to leave an escapement pin 53 projecting part way out from the escapement wheel 54, so that no error in calculation can arise from this source. It sometimes happens that an operator, in striking the wrong key, does not notice that he has done so until the key is partly depressed. But the described construction prevents trouble arising from such false stroke, since the key does not return to normal position, and hence the operator is obliged to depress the key fully in order to enable it to return to normal position. This operation of course thrusts up only one pin 53; the liability of two or more pins becoming partly projected from the wheel being avoided.

*Means for enabling each figure key to inter-* *fere with the operation of the other figure keys.*

Each of the key-operated arms 46 may be provided with a key-interference member in the form of a blade 75, Fig. 14, which may be in the form of a segment having the pivot 47 as a center. These blades 75, which are carried upon arms 76, formed upon said levers, are loosely guided or supported in a series of diametrical slots 77 formed in one end of the fixture 52, and the points of the blades form a circle around a small central opening 78, Fig. 14, in said support 52; and as long as said opening is occupied by a blade, no other blade can pass through said opening, as it will encounter the first blade; and hence it is impossible to operate any of the remaining figure keys until the first key has returned to or substantially to normal position. In other words, each key interferes with the operation of all the other keys, so that it is not practicable to depress more than one key at a time. One of the principal advantages of this device is that it prevents the operation of two keys simultaneously. It will also be seen that as soon as one key is partly depressed, it prevents the depression of any other key.

*Means controlled by the primary escapement* *wheel for locking the keys.*

Fixed to the shaft 59, which rocks each time that any figure key is depressed, is an arm 79, which is operatively connected to a bar 80, Fig. 9, to swing the latter forwardly beneath hooks 81, Fig. 5, provided upon the key-levers. This is part of the well-known Underwood line-lock mechanism disclosed in the patent to Helmond, 775,331. To operate the same, the carriage is provided with a lug 240, which, at the end of a typewritten line, engages an extension 241 on a bell-crank 242 to rock the latter. The other arm of this lever is provided with a pivoted dog 243, which rocks an arm 244 secured to a rock shaft 245 on which standards 88 are also secured. These standards 88 carry the lock bar 80. The connection includes a link 82 pivoted at one end to a head 83 provided upon one end of a rod 84, the latter being pivoted at 85 to an arm 86 of a bell-crank, and the bell crank having an arm 87 to engage one of a pair of rocking standards 88 carrying one end of said locking bar 80. Said arm 86 may be connected by a link 89 to an arm 90 of another bell crank (Fig. 6) the latter having a pin 91 to engage directly with the bar 80, to help swing it forwardly. When a key is depressed, the shaft

59 rocks and pulls the link 82, and, through the rod 84 and the bell cranks rocks the locking bar 80 forwardly beneath the key-lever hooks, so that no other key can be depressed. At the same time, a latch 92 (Fig. 20) is snapped by a spring 93 up into a notch 94 formed in the head 83, whereby the locking bar 80 is mechanically maintained in effective position, so that the keys cannot be unlocked until said latch 92 is released, even should the operated key rise again in the meantime. The latch 92 is releasable by means of an arm 95 fixed to a rock-shaft 96 upon which the latch is mounted; and the release may be effected by any of the teeth of the secondary escapement wheel 57 striking up the arm 95, and causing the latch 92 to drop from the notch 94. The parts are so constructed that this release takes place only when the primary escapement wheel 54 has come to rest or nearly so. Hence the keys remain locked until the primary escapement wheel has about completed its operation, so that it is impossible to operate any of the jacks 50 prematurely, and thereby cause the spurious projection of one or more of the escapement pins or teeth 53; so that liability is avoided of the escapement wheel acting erroneously at the succeeding operation.

Among other things it will be noticed that when a key is depressed it cannot return to normal position in advance of the return of the locking bar 80 to normal position, and hence the pawl 41 prevents the key from being operated a second time prior to the conclusion of the stroke of the escapement 57, which releases the latch 92 and permits the locking bar 82 to release all the keys including the one operated. Hence the computing mechanism cannot be prematurely operated either by the depressed key or any other key.

It will be understood that the escapement wheel 57 which controls the dog 56, is not fully released until the return stroke of the universal bar 66, that is, until the key starts upon its upward stroke; and that the operation of the primary escapement wheel 54 must take place thereafter and before the next key is depressed. Since all the keys operate the carriage-escapement mechanism, (that is, the dogs which control the step-by-step letter-feeding movements of the paper carriage), and since it is desired to prevent premature operation of said dogs, and hence insure that the paper carriage shall remain stationary during the operation of the primary escapement-wheel 54, it will be seen that all of the keys are locked by the bar 80; and hence the master wheel (which is controlled by the escapement wheel 54 and engages the adding wheels in succession at the step-by-step movements of the paper carriage) is maintained in engagement with the desired adding wheel during the operation of the primary escapement wheel 54.

It will be seen that said arm 79 is connected to the link 82 by means of a pin 97, Fig. 9, which engages a slot 98 extending along the link. This slot permits the return of the arm 79 and rock-shaft 59 to or toward normal position, in advance of the return of the link 82 and its connections to normal positions, for the purpose of feeding the paper carriage.

*Carriage-feeding devices and means to avoid rotation of the primary escapement wheel of the adding mechanism while the carriage is feeding.*—The figure keys 3 and the letter keys 100 are, in the Underwood machine, mounted upon a fulcrum rod 101 and held up in normal positions by returning springs 102, Fig. 16. Each of the key-levers is connected by means of a sub-lever 103 to a type bar 104 which strikes against the front side of platen 3$^b$. Upon each type-bar is a heel 106, which engages and presses backwardly a universal bar frame 107, and the latter in turn actuates a dog rocker 108 having fast and loose dogs 109, 110 for alternate engagement with an escapement wheel 111; the latter mounted upon a shaft, upon which is also mounted a pinion 113, to mesh with a rack 114 mounted upon a paper-carriage 115. When a figure key is depressed, the arm 60, Fig. 9, is swung over to the position at Fig. 20, and the active tooth of the secondary escapement wheel 57 slips off the dog 58 and engages a dog 116, which is rigid with the dog 58; said dog 116 serving for temporarily detaining this escapement wheel 57 until the return to or nearly to normal position of the arm 60, whereupon the wheel 57 escapes from the detent or dog 116, and the movement of the primary escapement-wheel 54 is permitted.

It will be seen that the heel 106 on the type bars releases the universal bar 107 during the initial part of the return stroke of the type bar. Hence near the beginning of the return stroke of the arm 60, Fig. 20, the paper carriage 115 is released for its letter-feeding movement.

A latch 117, Figs. 9 and 20, is pressed by a spring 118 into position to engage a jog 119 formed on the arm 60 when said arm has returned partly to normal position. Normally the latch is held back by a curved edge 120 formed on the arm 60; but upon the initial stroke of said arm 60, the spring 118 snaps the latch into position, (without preventing the completion of the initial stroke of arm 60) and at the same time snaps a pallet 121, Fig. 21, into one of the notches between the teeth of the escapement wheel 111; said latch being connected to said pallet by means of a rod 122, a lever 123, and a link 124. This pallet is designed to be engaged and to return to normal position by the succeeding tooth of the escapement wheel 111, which is turning in the direction of the arrow, during the letter-feeding movement of the carriage; whereby the latch 117 is withdrawn; but if the carriage action should be sluggish, the latch 117 remains effective, and the arm 60 is detained for an instant in the position at Fig. 18, at which time the escapement-wheel 57 still remains engaged by the detent dog 116, so that the primary escapement wheel 54 cannot turn. As soon, however, as the carriage escapement wheel 111 throws out the pallet 121, the return movement of the arm 60 toward normal position will be resumed, and the dog 116 will permit the escapement of the secondary wheel 57, and the latter may be freely driven by the projected escapement tooth 53 on the primary wheel 54. This movement of the primary escapement wheel 54 takes place when the paper-carriage is at rest or approximately in its arrested position.

*Adding wheels, adding-wheel carriage, and motor for rotating the adding wheels.*—The adding wheels are seen at 125 mounted in a carriage 126 connected by lugs 127 to the typewriter carriage 115, Fig. 16. The shaft which turns the adding wheels is designated as 128, and may be constructed and operated in the manner set forth in said pending application No. 485,030 filed March 22, 1909. Said shaft is rotated by means of a motor 129, Figs. 6 and 10. The shaft 130 of the latter is constantly in rotation and carries a friction clutch comprising spring arms 131 and centrifugal shoes or clutches 132 thereon, Fig. 11, the latter bearing upon the interior of a friction clutch drum 133, to which is fixed a bevel pinion 134. With said pinion meshes a bevel pinion 135 upon a shaft 136 carrying at its other end a bevel pinion 137. The latter meshes with a bevel pinion 138, and to this is fixed a pinion 139 meshing with a pinion 140, which is fixed to the primary escapement wheel 54, whereby the train of gears, just described, is held stationary, together with the drum 133, during the rotation of the motor 129, until the escapement wheel is permitted to turn in the manner already described. The connection to the adding wheels includes a pinion 141 meshing with 138 and carried on the same shaft 142 with a pinion 143; and the latter meshes with a pinion 144 on a vertical shaft 145.

By means of a clutch 146, Fig. 10, controlled by a lever 147, either of two pinions 148, 149, on said shaft 145, may be caused to turn a pinion 150 on said shaft 128. By shifting the clutch the shaft 128 may be turned either forwardly or backwardly, so that the adding wheels may operate in either direction for either addition or subtraction as may be required.

The shaft 128 extends through a tube 151 and carries at its end a master wheel 152, the teeth of which project from the tube and engage internal teeth 153, which may ride upon said tube 151 and upon another tube or shaft 152ª in line therewith. Said teeth 153 are formed upon gears 154, which are also housed in the carriage 126 and mesh with gears 155 provided upon the adding wheels 125.

Meshing with each gear 154 is a pinion 156, to which is connected a scalloped wheel 157 (Fig. 14ᵇ) engaged by a spring-detent roll 158. Each gear 154 carries a special tooth 159 (Fig. 14ª), which once in every revolution (at the tens-carrying operation) engages a five-toothed pinion 160 provided upon the succeeding pinion 156, thereby turning the next gear 154 with its adding wheel 155. At this operation one of the teeth of the wheel 157 engages a soft rubber roll 161, which is in constant rapid rotation, and is thereby assisted and turned until the detent 158 falls into the succeeding scallop or notch, as set forth in said application. Said soft-rubber roll is fixed upon a shaft 162 connected at one end to a bevel pinion 163, and which may be caused to rotate by either of two pinions 164, 165 provided upon a vertical shaft 166, the latter having at its lower end a pinion 167, to mesh with a pinion 168 on a shaft 169, the latter having at its other end a bevel pinion 170, to mesh with a bevel pinion 171 provided upon a short horizontal shaft 172, which is connected by pinions 173, 174 and 175, Fig. 12, with the constantly rotating motor shaft 130. It will be noticed that the pinions 173, 174 and 175, together with the clutch devices 131, 132 and 133, are contained in a closed case 176, the cover 177 of which is detachably secured by screws 178, so that the box may be opened for introducing lubricant or the like, or suitable material with which the box may be filled.

It will be seen that the clutch lever 147 is also connected to a clutch 179 for operating the pinion 163 by either pinion 164 or 165, so that the motion of the rubber-roll 161 may be reversed to correspond with the addition or subtraction action of the adding wheels.

*Operation.*—The motor 129 having been set in operation, whereby the tens-carrying roll 161 is kept in constant rotation, the handle 25 is pushed to the Fig. 2 position, to connect the adding mechanism to the type keys 3. The paper carriage 115 is then set to the proper position to begin the writing and adding of numbers.

Keys 3 are then depressed successively to write the desired numbers, each key operating through an elbow lever 103 to throw the type bar 104 up to print.

The heel 106 upon the type bar pushes back the universal bar 107, and the latter moves the dog 110 out of engagement with the carriage escapement wheel 111, and the dog 109 into engagement with said wheel; the dog 110 making its usual stepping movement to position to engage the succeeding notch in the escapement wheel 111.

During said downward movement of the key, the link 6 is pulled down, the bell crank 39 is rocked, and the link 45 pulled to the left. This rocks the lever 46, throwing the blade 75 into position to intercept any of the remaining blades. At the same time the jack 50 thrusts one of the escapement pins 53 toward the right, so that the latter is projected into the path of the four-toothed rotary dog 55.

At the same time the lever 46 presses the universal disk 66 toward the left, at Figs. 1 and 6, thereby vibrating the lever 62, and through the link 61 rocking the arm 60 from the position at Fig. 9 to the position at Fig. 20. By this movement the shaft 59 is rocked, and the secondary escapement wheel 57 of the adding mechanism escapes the dog 58 and engages the dog 116.

At the same time the arm 79 upon said rock shaft 59 moves the head 83 and link 84 to turn the bell cranks 86, 87, 90 and 91 (Fig. 6), to swing the locking bar 80 forwardly beneath the hooks 81 on all the key levers except the one depressed, whereby operation of the carriage feeding devices by any of said key levers is prevented. The latch 92 is snapped by the spring 93 into the notch 94 in said head 83, to hold the key-locking bar 80 in its effective position.

Upon the release of the key from pressure, the key and type bar are returned to normal positions by the spring 102; and the universal bar and feed dogs 109, 110 are returned to normal positions by the usual spring (shown diagrammatically at 180, Fig. 16).

As usual in the Underwood machine, the universal bar 107 remains motionless during the major portion of the printing stroke of the type bar, and is returned to normal position during the initial portion of the return stroke of said type bar to normal position. Hence the carriage 115 is released while the type is only a short distance from the platen 3ᵇ.

During this initial portion of the return stroke of the key, the head 83 and the locking bar 80 remain in their effective positions; but the arm 60 and the rock shaft 59 are rocked toward normal positions by springs 182 and 69, Figs. 9 and 20, the pin 97 on the arm 79 moving freely along the slot 98 in the link 82, as at Fig. 18.

During this return movement, the tooth of the secondary escapement wheel 57 bears against the backwardly moving dog 116, but does not quite escape therefrom, owing to the engagement of the notch 119 (in the bell crank 60) by the arresting hook or pawl 117, as at Fig. 18; this pawl being held in engagement with the tooth 119 by the spring 118, Fig. 20; said spring also causing the pallet 121 to project toward the succeeding tooth of the carriage escapement wheel during the latter part of the initial stroke of the bell crank 60, as at Figs. 20 and 21; and the hook being intended to intercept said bell crank 60 in the return movement of the latter. The spring 118 it will be understood acts upon the link 122 to move the pawl 117 to the position at Fig. 20, and at the same time vibrates the lever 123 and acts upon the link 124 to move the pallet 121 from the idle normal position at Fig. 21 to the position at Fig. 19. Hence the secondary escapement wheel 57 of the adding mechanism is temporarily detained until said succeeding tooth of the carriage escapement wheel 111 engages said pallet 121; as at Fig. 19, and pushes the same to the position at Fig. 9ª. This withdraws the pawl 117 from the notch 119, and permits the springs 182 and 69 to return the bell crank 60 and the rock shaft 59 to normal position, the secondary escapement wheel 57 being thereby released, so that the projecting escapement pin on the primary escapement wheel 54 is enabled to rotate the dog pinion 55 and escape past the same.

The escapement wheel 54 now rotates until the escapement tooth 53 thereon, which was projected by the last depressed key, comes into engagement with the succeeding dog of the pinion 55, and causes the succeeding tooth on the secondary escapement wheel 57 to strike the dog 58, whereby the escapement wheel is arrested.

During this movement of the secondary escapement wheel 57, the tooth thereof which was last in engagement with the dog 116 swings up the arm 95 and withdraws the latch 92 from the notch 94, thereby permitting a spring 183, Fig. 9, to withdraw the locking bar 80 from the key hooks 81, thus releasing the keys.

It will also be understood that during the return key stroke, the blade 75 is withdrawn from the paths of other blades, so that another key may be operated.

The original projected escapement pin 53 is returned to normal position by a stationary cam 53ª (Fig. 8) during the movement of the escapement wheel.

The described movement of the primary escapement wheel 54 was effected by the motor 129 through the clutch seen at Fig. 11, and the train of gearing 134, 135, 136, 137, 138, 139 and 140; and a corresponding movement was imparted through the gearing 141, 143 and 144 and through the reversible clutch 146 to the pinion 150, shaft 128 and master wheel 152, thereby rotating the adjacent pinion 154, and the gear 155 of the adding wheel 125. This movement of the master wheel occurs after the paper carriage 115 has come to rest, that is, after it has completed its letter-feeding movement.

The tens-carrying or assisting shaft 162 is constantly rotated by the motor 129 by means of the train of gearing including 175, 174, 173, 171, 170, 168 and 167, clutch 179, and pinion 163. Said pinion 163, Fig. 17, is fixed upon a shaft 188, which is journaled on a fixture 189, Fig. 16, and carries a gear 190, in mesh with which is a pinion 191. The latter is mounted upon a shaft 192, which may be square in cross section, to fit a bore in a sliding pinion 193, Figs. 1, 16 and 17, which is mounted upon the computing wheel carriage 126 and meshes with a pinion 194, fixed upon the shaft which carries the revolving soft rubber roll 161. Said carriage 126 has rolls 183$^a$ whereby it runs on a rail 183$^b$.

Whenever the platen shift key 184 is depressed, (Fig. 16), its elbow-like lever 185 presses forwardly an arm 186 of a frame which carries a shift rail 187, and the latter lifts the platen frame 3$^c$ and platen 3$^b$ in a well-known manner. Extending forwardly from this shift frame is the arm 38, having the ear 37 to press down the rod 36, thereby moving the parts to the position seen at Fig. 3, to disconnect the keys from the adding mechanism.

Reference is made to co-pending applications of Walter Wright, Nos. 388,766, 428,020, and 485,046, and of Walter Wright and Gustave O. Degener, No. 485,030; no claim being made herein to any of the inventions disclosed in any of said applications. The claims in this application are limited to improvements which are not shown in any of said applications.

Variations may be resorted to within the scope of the invention, and portions of the improvements may be used without others, as for instance certain of the computing devices may be employed independently of the typewriting mechanism.

Having thus described our invention, we claim:

1. The combination with adding devices, of type-operating levers, releasable links connecting said levers to said adding devices, each lever having upper and lower jaws, and the links having hooks between the jaws; guards being provided to prevent the hooks from getting below the lower jaw.

2. The combination with adding devices, of type-operating levers, releasable links connecting said levers to said adding devices, each lever having upper and lower jaws, and the links having hooks between the jaws; guards being provided to prevent the hooks from being swung to positions directly over the upper jaws.

3. The combination with adding devices, of type-operating levers, releasable links connecting said levers to said adding devices, each lever having upper and lower jaws, and the links having hooks between the jaws; guards being provided to prevent the hooks from getting below the lower jaw, and guards being also provided to prevent the hooks from being swung to positions directly over the upper jaws.

4. The combination with adding devices, of type-operating levers, releasable links connecting said levers to said adding devices, each lever having upper and lower jaws, and the links having hooks between the jaws, the lower jaw being extended to form a guard to prevent the hook from getting below said jaw; and the upper jaw being extended upward to form a guard to prevent the hook from being swung directly over said upper jaw.

5. The combination of type-operating keys, computing mechanism including adding wheels and a master wheel therefor, bell-cranks or levers releasably connected to said keys, means operated by said bell cranks for controlling the movements of said master-wheel, segments upon said bell cranks, and pawls to engage said segments to prevent premature reversals of the key movements.

6. The combination with a set of keys, of a set of radiating levers connected thereto, a master wheel, computing wheels controlled by the master wheel, means to enable said levers to control the movements of said master wheel, and blades provided upon said levers and radiating about a common center and movable by said keys to a central position to enable each blade to intercept the remaining blades.

7. The combination with a set of type-operating figure keys and computing mechanism controlled by said keys, of a set of interfering devices connected to said keys, one interfering device to each key, said interfering devices constructed to coöperate with one another to prevent the operation of two keys at the same time, and means to release the keys from said computing mechanism and said interfering devices.

8. The combination with a set of keys, of a set of radiating levers connected thereto, a master wheel, computing wheels controlled by the master wheel, means to enable said levers to control the movements of said master wheel, blades provided upon said levers and radiating about a common center and movable by said keys to a central position to enable each blade to intercept the remaining blades, and means to disconnect said keys from said levers.

9. The combination with computing wheels, a master wheel, an escapement wheel connected to said master wheel, said escapement wheel provided with settable teeth, of keys, types operated by said keys, means to enable the keys to set said teeth, means to prevent the operation of two keys simultaneously, and means to release the keys from said setting means and said operation-preventing means.

10. The combination with a set of keys, of a set of radiating levers, connections from the keys to the levers including a set of links, the latter having crooks to releasably engage said levers, computing mechanism controlled by the levers, a disk adjacent to said levers and having slots to guide the links and to prevent them from becoming disengaged from said levers, and releasable means to hold said disk against rotation.

11. The combination with a set of keys, of a set of radiating levers, connections from the keys to the levers including a set of links, the latter having crooks to releasably engage said levers, computing mechanism controlled by the levers, and including an escapement-wheel having teeth settable by said levers, a master wheel connected thereto, a disk adjacent to said levers and having slots to guide the links and to prevent them from becoming disengaged from said levers, releasable means to hold said disk against rotation, said disk being movable by any of said levers in the direction of its axis, and a dog mechanism operated by said disk to control the movements of the escapement wheel of the computing mechanism.

12. The combination with a step-by-step feeding carriage and keys having means to control the movements thereof, of a computing device, a part of which is connected to said carriage, and which includes a master wheel and computing wheels relatively movable to successive denominations, and an escapement wheel connected to said master wheel; means to enable said keys to control the operation of said escapement wheel; a device operable by certain of said keys to lock the other keys against depression; a latch to hold said lock in effective position at the return of the depressed key toward normal position; and means controlled by said escapement wheel at the conclusion of its rotation to release said latch, and thereby release the keys.

13. The combination with a step-by-step feeding carriage and keys having means to control the movements thereof, of a computing device, a part of which is connected to said carriage, and which includes a master wheel and computing wheels relatively movable to successive denominations, and an escapement wheel connected to said master wheel; means to enable said keys to control the operation of said escapement wheel; a universal key-locking bar; means to enable certain of said keys to move said locking bar to effective position; means to detain said locking bar; and means controlled by said escapement wheel to release said locking bar.

14. The combination with types and keys to operate them, of a letter-feeding carriage controlled by the keys, an escapement wheel forming part of a power-driven computing mechanism of which a portion is connected to said carriage, said computing mechanism including computing wheels controllable by said escapement wheel, means to enable certain of said keys to control said escapement wheel and effect computations, and means dependent upon the operation of certain of said keys for preventing the operation of other keys until the completion of the movement of said escapement wheel.

15. The combination with types and keys to operate them, of a carriage, carriage-feeding mechanism connected to the keys and including means to release the carriage during the return strokes of the keys, a computing mechanism operable by certain of said keys and including an escapement wheel, a portion of said computing mechanism being connected to said carriage, and said computing mechanism including computing wheels controllable by said escapement wheel, a bar movable by certain of said keys to position for locking the remaining keys against depression, means for detaining said locking bar in effective position while the depressed key releases said carriage, and means dependent upon the operation of said escapement wheel for releasing said locking bar.

16. The combination with types and keys to operate them, of a carriage; carriage-feeding mechanism connected to the keys; a power-driven computing mechanism operable by certain of said keys and including an escapement wheel; both said carriage and said escapement wheel being releasable by the keys during the return strokes thereof; a portion of said computing mechanism being connected to said carriage, and said computing mechanism including computing wheels controllable by said escapement wheel, and means operable by certain of said keys and releasable through the movement of said escapement wheel, for locking others of said keys against depression.

17. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel, a bar operable by certain of said keys at the depression thereof to lock other keys against operation, and means for detaining said locking bar in effective position; said detaining means being releasable through the movement of said escapement wheel.

18. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel, a bar operable by certain of said keys at the depression thereof to lock other keys against operation, and means for detaining said locking bar in effective position; said detaining means being releasable through the movement of said escapement wheel; said locking bar forming part of a line-locking mechanism, and being movable independently of all of said keys for the purpose of locking them at the completion of a line of writing.

19. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel; an escapement mechanism operable by certain of said keys, for releasing and arresting said escapement wheel; a normally ineffective bar extending along the keys to lock the same against depression; a connection from said escapement mechanism to said bar to operate the latter; and a latch to retain said bar in effective position; means being provided to enable said escapement wheel to trip the latch.

20. The combination with a set of keys, of a carriage-feeding mechanism connected to the keys; a power-driven computing mechanism including an escapement wheel provided with settable escapement teeth; a portion of said computing mechanism being connected to said carriage, and said computing mechanism including computing wheels controlled by said escapement wheel; means to enable said keys to set said escapement teeth; a pinion rotated by said escapement teeth; a secondary escapement wheel connected to said pinion; means to enable said keys to control said secondary escapement wheel; a bar extending along said keys to lock them against depression; means operated by any of said keys to move said bar to effective position; a latch to hold said bar in effective position; and means to enable said secondary escapement wheel to release said latch.

21. The combination with a set of keys, of a carriage-feeding mechanism connected to the keys; a power-driven computing mechanism including an escapement wheel provided with settable escapement teeth; a portion of said computing mechanism being connected to said carriage; and said computing mechanism including computing wheels controlled by said escapement wheel; means to enable said keys to set said escapement teeth; a pinion rotated by said escapement teeth; a secondary escapement wheel connected to said pinion; means to enable said keys to control said secondary escapement wheel; means to enable each key to lock the remaining keys against actuation, and means releasable by said secondary escapement wheel for detaining said locking means in effective position.

22. In a computing mechanism, the combination with computing wheels and a power-driven master wheel, of an escapement wheel connected to said master wheel, a series of keys, means to enable said keys to control the movement of said escapement wheel, a locking bar extending along said keys and normally ineffective and movable by any key into position to lock the remaining keys, and means releasable by said escapement wheel for detaining said locking bar in effective position.

23. In a computing mechanism, the combination with computing wheels and a power-driven master wheel, of an escapement wheel connected to said master wheel, a series of keys, means to enable said keys to control the movement of said escapement wheel, a locking bar extending along said keys and normally ineffective and movable by any key into position to lock the remaining keys, and means releasable by said escapement wheel for detaining said locking bar in effective position, means being provided to prevent premature reversal of the movement of any key.

24. In a computing mechanism, the combination with computing wheels and a power-driven master wheel, of an escapement wheel connected to said master wheel, a series of keys, means to enable said keys to control the movement of said escapement wheel, a locking bar extending along said keys and normally ineffective and movable by any key into position to lock the remaining keys, and means releasable by said escapement wheel for detaining said locking bar in effective position, means being provided to prevent premature reversal of the movement of any key, and said locking bar being constructed to prevent the return of the depressed key prior to the return of the locking bar itself to normal position.

25. In a computing mechanism, the combination with computing wheels and a power-driven master wheel, of an escapement wheel connected to said master wheel, a series of keys, means to enable said keys to control the movement of said escapement wheel, normally ineffective means to enable each key to lock the remaining keys against actuation, and means releasable by said escapement wheel for detaining said locking means in effective position.

26. In a computing mechanism, the combination with computing wheels and a power-driven master wheel, of an escapement wheel connected to said master wheel, a series of keys, means to enable said keys to control the movement of said escapement wheel, normally ineffective means to enable each key to lock the remaining keys against actuation, and means releasable by said escapement wheel for detaining said locking means in effective position, means being provided to prevent premature reversal of the movement of any key.

27. The combination with a typewriting mechanism including type-operating keys, of a computing mechanism including computing wheels, a power-driven master wheel, and an escapement wheel connected to said master wheel; means to enable certain of said keys to control the movement of said escapement wheel and effect computations; normally ineffective means to enable each computing key to lock the remaining keys against actuation; and means releasable by said escapement wheel for detaining said locking means in effective position.

28. The combination with a typewriting mechanism including type-operating keys, of a computing mechanism including computing wheels, a power-driven master wheel, and an escapement wheel connected to said master wheel; means to enable certain of said keys to control the movement of said escapement wheel and effect computations; normally ineffective means to enable each computing key to lock the remaining keys against actuation; means releasable by said escapement wheel for detaining said locking means in effective position, and means for disconnecting said computing keys from said computing mechanism and from said locking means simultaneously.

29. The combination with a typewriting mechanism including type-operating keys, of a computing mechanism including computing wheels, a power-driven master wheel, and an escapement wheel connected to said master wheel; means to enable certain of said keys to control the movement of said escapement wheel and effect computations; normally ineffective means to enable each computing key to lock the remaining keys against actuation; means releasable by said escapement wheel for detaining said locking means in effective position, checking means to prevent premature reversal of the movement of any computing key; and means to silence said computing mechanism, said locking means and said checking means simultaneously.

30. The combination with a typewriting mechanism including type-operating keys, of a computing mechanism including computing wheels, a power-driven master wheel, and an escapement wheel connected to said master wheel; means to enable certain of said keys to control the movement of said escapement wheel and effect computations; normally ineffective means to enable each computing key to lock the remaining keys against actuation; means releasable by said escapement wheel for detaining said locking means in effective position, and means to silence said computing mechanism and said locking means simultaneously.

31. The combination with a typewriting mechanism having keys, and a computing mechanism controlled by the keys, of individual interfering devices connected to the keys, one to each key to prevent the depression of two keys simultaneously, and means for simultaneously silencing the computing mechanism and said interfering devices.

32. The combination with a typewriting mechanism having keys, and a computing mechanism controlled by the keys, of individual interfering devices connected to the keys, one to each key to prevent the depression of two keys, simultaneously, checking mechanism to prevent premature reversal of the operation of the keys, means for simultaneously silencing the computing mechanism and said interfering devices, and means for simultaneously disconnecting the keys from the computing mechanism and silencing the interfering devices and the checking devices.

33. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel, a bar operable by certain of said keys at the depression thereof to lock other keys against operation, and means for detaining said locking bar in effective position; said detaining means being releasable through the movement of said escapement wheel; checking means being provided to prevent premature reversal of the movement of any computing key.

34. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel, a bar operable by certain of said keys at the depression thereof to lock other keys against operation, means for detaining said locking bar in effective position; said detaining means being releasable through the movement of said escapement wheel; checking means being provided to prevent premature reversal of the movement of any computing key, and means for simultaneously silencing the computing devices, the key-locking mechanism and the checking means.

35. The combination with types and keys to operate them, of a letter-feeding carriage controlled by the keys, an escapement wheel forming part of a power-driven computing mechanism of which a portion is connected to said carriage, said computing mechanism including computing wheels controllable by said escapement wheel, means to enable certain of said keys to control said escapement wheel and effect computations, and means dependent upon the operation of certain of said keys for preventing the operation of other keys until the completion of the movement of said escapement wheel; checking means being provided to prevent premature reversal of the movement of any computing key.

36. The combination of a set of computing wheels, a master-wheel, and a tens-carrying mechanism including a constantly revolving shaft having means to assist at the tens-carrying operation, a motor having a shaft, two trains of gear mechanism ramifying from the motor, one train extending to said master wheel and the second train extending to said constantly-revolving shaft, the master wheel train having a key-controlled escapement wheel connected thereto, and a clutch being interposed between the escapement wheel and the motor; the second train being connected to the motor shaft between said shaft and the motor itself.

37. The combination of a set of computing wheels, a master-wheel, and a tens-carrying mechanism including a constantly revolving shaft having means to assist at the tens-carrying operation, a motor having a shaft, two trains of gear mechanism ramifying from the motor, one train extending to said master wheel and the second train extending to said constantly-revolving shaft, the master wheel train having a key-controlled escapement wheel connected thereto, a clutch being interposed between the escapement wheel and the motor; the second train being connected to the motor shaft between said shaft and the motor itself, said second train including a gear upon the motor shaft and a gear meshing therewith; and a lubricant box including the last-mentioned gears and also containing said clutch mechanism.

38. In a combined typewriting and adding machine having a carriage and keys to feed said carriage, the combination of a computing device comprising a plurality of numeral members, numeral keys to operate said computing device, means for connecting and disconnecting said numeral keys with the computing devices, and means for automatically locking the unoperated keys until after the completion of the movements of the computing device.

39. In a combined typewriting and adding machine having a carriage and keys to feed said carriage, a computing device comprising a set of numeral members, keys to operate said computing device, means for connecting and disconnecting said numeral keys with the computing device, means operable through the depression of any one of the numeral keys for locking all the other keys, and means for automatically locking the unoperated keys until after completion of the movements of the computing devices.

40. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, and means operable through the depression of any one of said numeral keys for locking the remaining numeral keys and the alphabet keys.

41. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, and means for locking each numeral key during its downward movement until a completion of its stroke.

42. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, and movable locking means adjacent each of the numeral keys for engaging them and preventing a return movement thereof until after a complete downward or upward stroke of the keys.

43. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, movable locking means adjacent each of the numeral keys for engaging them and preventing a return movement thereof until after a complete downward or upward stroke of the keys, serrated or toothed segments operable through depression of the numeral keys, and pawls or dogs for engaging said segments whereby the key is locked against return movement until a complete downward or upward stroke thereof.

44. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, movable locking means adjacent each of the numeral keys for engaging them and preventing a return movement thereof until after a complete downward or upward stroke of the keys, and a series of radially disposed arms connected to and actuated by numeral keys constructed to pass a common center, whereby after the depression of one key its arm is moved into the path of travel of the remaining keys and movement thereof prevented.

45. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, movable locking means adjacent each of the numeral keys for engaging them and preventing a return movement thereof until after a complete downward or upward stroke of the keys, and a series of arms connected to and actuated by the downward movement of the numeral keys and so arranged as to travel at an angle toward each other, whereby when one of the keys is depressed and its arm moved into the path of travel of the remaining keys movement of the latter is thereby prevented.

46. In a combined typewriting and adding machine having a paper carriage and type keys to feed said carriage, and having in combination therewith a computing device, interdependent drive mechanisms for operating said computing device, one of said mechanisms being constantly driven and the other being normally silent or out of operation, numeral keys for bringing said mechanisms into relation whereby the computing device is set in motion, movable locking means adjacent each of the numeral keys for engaging them and preventing a return movement thereof until after a complete downward or upward stroke of the keys, and a series of arms converging toward a common center connected to and actuated by the downward movement of the numeral keys and so arranged as to travel at an angle toward each other, whereby when one of the keys is depressed and its arm moved into the path of travel of the remaining keys a movement of the latter is thereby prevented.

47. The combination with types and keys to operate them, of a carriage; carriage-feeding mechanism connected to the keys; a power-driven computing mechanism operable by certain of said keys and including an escapement wheel; a portion of said computing mechanism being connected to said carriage, and said computing mechanism including computing wheels controllable by said escapement wheel, a bar operable by certain of said keys at the depression thereof to lock other keys against operation, means for detaining said locking bar in effective position; said detaining means being releasable through the movement of said escapement wheel; and said bar being constructed to restrain the depressed key from rising, and means for preventing the reactuation of the depressed key until it rises to normal position; whereby re-operation of the computing mechanism by the depressed key is prevented until completion of the operation of said escapement wheel.

48. In a combined typewriting and adding machine, the combination of type-operating numeral keys, type-operating alphabet keys, a step-by-step feeding carriage controlled by all of said keys, a power-driven computing mechanism including a member which has a denominational step-by-step movement concomitantly with the carriage, said computing mechanism having an escapement wheel the extent of whose rotation is controlled by said numeral keys, means dependent upon the operation of the numeral keys and the movement of the carriage for releasing said escapement wheel, and means releasable by said escapement wheel for locking all of said keys against operation.

49. In a combined typewriting and computing machine, the combination with key levers and computing mechanism, of means for locking said key levers, means for setting said lock by the operation of one of said keys, a latch holding said lock set, and means positively moved by said computing mechanism for releasing said latch.

50. In a combined typewriting and computing machine, the combination with key levers and computing mechanism, of a bar for locking under hooks on said key levers, means for setting said bar by the operation of one of said keys, a latch holding said bar set, and means positively moved by said computing mechanism for releasing said latch.

51. In a computing machine, the combination with computing wheels, of numeral keys, power means for driving them, an escapement wheel for controlling said power, a lock for said keys set by the operation of any key, a rod operating said lock, a spring latch arranged to hold said rod, and an arm on said latch arranged to be moved by said escapement wheel to release said lock.

52. In a combined typewriting and computing machine, the combination with computing wheels, of keys controlling them, means for preventing the simultaneous operation of keys, means preventing the operation of one key till the operation of another is complete, and means preventing the incomplete operation of a key.

53. In a combined typewriting and computing machine, the combination with key levers operating type, of hooks extending from said levers, a bar for locking said levers by said hooks, computing wheels operated by certain of said levers, means for moving said bar to locking position, a latch for holding it there, a traveling carriage controlled by the operation of said key levers, and means moved by the movement of said carriage through said key levers for releasing said latch.

54. In a combined typewriting and computing machine, the combination with numeral and alphabet key levers operating type, of computing wheels controlled by said numeral levers, a carriage controlled in its letter feed by said key levers, means locking all other key levers by the operation of one key lever, and locking the operated key lever against return, a latch holding said levers locked, and means positively moved by the letter feeding control of said carriage for releasing said latch.

55. In a combined typewriting and computing machine, the combination with numeral and alphabet key levers operating type, of computing wheels controlled by said numeral levers, a carriage controlled in its letter feed by said key levers, means locking all other key levers by the operation of one key lever, and locking the operated key lever against return, means preventing the incomplete operation of a numeral key lever, a latch holding said levers locked, and means positively moved by the letter feeding control of said carriage for releasing said latch.

56. In a combined typewriting and computing machine, the combination with computing mechanism and numeral keys operating it, of a traveling carriage fed by said keys, alphabet keys, and a lock operated by every numeral key to hold every other numeral and alphabet key locked till released by the feed of said carriage.

57. In a combined typewriting and computing machine, the combination with computing mechanism and numeral keys operating it, of a traveling carriage fed by said keys, alphabet keys, a lock operated by every numeral key to hold every other numeral and alphabet key locked, a latch holding said lock operative till released by the positive operation of the computing mechanism, and a latch holding said lock operative till released by the positive movement of the carriage.

58. The combination with a computing mechanism, of a series of numeral keys for controlling the action of said computing mechanism, a shifter for controlling the effectiveness of said numeral keys to govern the action of said computing mechanism, a segment arm connected to said shifter, a second segment arm meshing with said first-mentioned segment arm, and a key connected to operate said second-mentioned segment arm.

59. The combination with a computing mechanism, of a series of numeral keys for controlling the action of said computing mechanism, a shifter for controlling the effectiveness of said numeral keys to govern the action of said computing mechanism, a segment arm connected to said shifter, a second segment arm meshing with said first-mentioned segment arm, a key connected to operate said second-mentioned segment arm, and a spring for normally holding said key in a certain position.

60. The combination with a computing mechanism, of a series of numeral keys for controlling the action of said computing mechanism, a series of links, one individual to each of said numeral keys shiftable to determine the effectiveness of said numeral keys to govern the action of said computing mechanism, means on each of said numeral keys for engaging said links to effect the operative connection between said numeral keys and said computing mechanism, and guards on said keys for preventing the movement of said links when in their disconnected position to positions out of range of said connecting means on said keys.

61. The combination with a computing mechanism, of a series of numeral keys for controlling the action of said computing mechanism, a series of links, one individual to each of said numeral keys shiftable to determine the effectiveness of said numeral keys to govern the action of said computing mechanism, means on each of said numeral keys for engaging said links to effect the operative connection between said numeral keys and said computing mechanism, and guarding means for maintaining said keys and said links always in a position ready to be connected up after having been disconnected.

62. The combination with a member having a series of pins settable from an ineffective position to a computation-determining position, a series of levers, a jack connected to each of said levers and arranged to be plunged against said pins to set the same, a blade on each of said levers, said blades moving across a common point to interfere one with the action of the others, a link connected to each of said levers, a series of numeral keys, and connections between said links and said numeral keys, whereby any of said keys may set one of said pins at a time, moving its associated blade to an interfering position to prevent the concomitant setting of another of said pins by another of said keys.

63. The combination with a numeral key, of a hook connected to said numeral key, a bell crank connected to said hook, a link connected to said bell crank, a lever connected to said link, an interfering blade on said lever movable at the actuation of said key to a locking position, a jack pivotally mounted on said lever, and a member bearing pins settable from a silent position to a computation-determining position, one of said pins being located in apposition to said jack, so as to be set thereby at the actuation of said numeral key.

64. The combination with a computing mechanism, of a series of numeral keys for controlling the action of said computing mechanism, locking means for said keys, setting means for bringing said locking means into play, and a lost-motion connection between said setting means and said locking means to enable the maintenance of said locking means in action after said setting means has returned to a normal position subsequent to the bringing into play of said locking means.

65. The combination with a computing mechanism, of a series of numeral keys for controlling the action of said computing mechanism, locking means for said numeral keys brought into play at the incitation of said computing mechanism to action by said numeral keys, setting means for bringing said locking means into play at the incitation of said computing mechanism to action, and a lost-motion connection between said locking means and said setting means enabling the return of said setting means to permit a continuation of the computing action started subsequent to the bringing of the locking means into play and prior to the return of the locking means to its ineffective position.

66. The combination with a valuating mechanism, including a series of levers, of a universal disk common to all of said levers arranged to be operated thereby, numeral keys individual to said levers for controlling the action thereof, an adjustably-mounted rod connected to said disk, a spring for maintaining said rod and said disk in a normal position, and a finger secured to said rod for guiding the movement thereof.

67. The combination with a valuating mechanism including a series of levers, of a universal disk common to all of said levers and arranged to be operated thereby, numeral keys individual to said levers for controlling the action thereof, an adjustably-mounted rod connected to said disk, a spring for maintaining said rod and said disk in a normal position, a finger secured to said rod for guiding the movement thereof, and means for adjustably mounting said finger on said rod, so that the position of said disk relative to said levers can be adjusted.

68. In a combined typewriting and computing machine, the combination of a computing mechanism, a power-drive therefor, numeral keys, means whereby the power-drive is connected to operate the computing mechanism on depression of each numeral key, a lock to prevent operation of the keys, and means controlled by the computing mechanism and effective at the completion of its operation to release the lock.

69. In combination, a lever, a rod having two collars, one fixed and one movable, and spaced apart from each other to permit of the insertion of the lever therebetween, a group of sickle-shaped levers having interfering blades and engaging one of said collars to operate said lever, heels for determining the extent of movement of the sickle-shaped levers, keys connected to the latter, and computing mechanism including indexing devices controlled by said keys.

70. In a combined typewriting and computing machine, the combination with type-operating keys and a lock for said keys, of a typewriter escapement, a computing escapement, and a latch for said lock controlled by said escapements.

71. In a computing machine, the combination with keys, of computing devices including an escapement, key-set means to lock the keys against untimely operation, and means operated by the computing escapement to release the keys from said locking means.

72. In a combined typewriting and computing machine, the combination with computing mechanism and an escapement therefor, of numeral keys operating the escapement, alphabet keys, a traveling carriage fed by said keys, and a lock operated by every numeral key to hold every other numeral key and alphabet key locked until released by the completion of the operation of said computing escapement.

73. In a combined typewriting and computing machine, the combination with computing mechanism and an escapement therefor, of numeral keys operating the escapement, alphabet keys, a traveling carriage fed by said keys, a lock operated by every numeral key to hold every other numeral key and alphabet key locked until released by the completion of the operation of said computing escapement, a latch for so holding the keys locked, and means for positively kicking off said latch by the completion of the operation of the computing escapement.

74. The combination with a typewriter having a line lock, of a computing mechanism having control of said lock, and connections whereby said control is effected.

75. In a combined typewriting and computing machine, the combination with a traveling carriage and an escapement therefor, of a computing escapement, a secondary escapement for said computing escapement, a key lock, a latch therefor, and connections whereby the typewriter escapement operates the secondary escapement which operates the computing escapement which controls the latch.

76. In a typewriting machine, the combination with a line-locking device and a typewriter escapement, of computing means including an escapement, and means whereby said escapements control said line-locking device.

77. In a typewriting machine, the combination with a line-locking device and a typewriter escapement, of computing means including an escapement, and means whereby the typewriter escapement controls the computing mechanism to control the line-locking device.

78. In a combined typewriting and computing machine, the combination with a traveling typewriter carriage, and keys operating types, of a device for locking said keys at the end of travel of said carriage, a computing device, and means for operating said locking device from said computing device.

79. In a combined typewriting and computing machine, the combination with a traveling typewriter carriage, and key-operated types, of a device for locking said keys at the end of travel of said carriage, a power-driven computing device, means for controlling said computing device from said keys, and means to enable said computing device to control said locking device.

80. The combination with a typewriter carriage and type-operating keys, of a line-locking device for said keys, a computing device controlled by said keys and including an escapement device operated by said keys, and means for controlling said line-locking device by said escapement device.

81. The combination with a typewriter carriage and type-operating keys, of levers connected to said keys, a locking bar effective on said levers, a computing device controlled by said keys and including an escapement operated by said keys, means for controlling said bar by said carriage, and means for controlling said bar by said escapement, said two mentioned means supplementing the actions of each other.

82. In a typewriting machine, the combination with numeral keys and alphabet keys, of a line-locking device for all said keys, means for making said line-locking device effective by the operation of any numeral key, a latch for holding it effective, a computing machine escapement, and means for kicking off said latch by said computing machine escapement.

83. In a typewriting machine, the combination with numeral keys and alphabet keys, of a traveling carriage, an escapement for said carriage controlled by said keys, a line-locking device for said keys, means for making said line-locking device effective by the operation of any numeral key, a latch controlled by said carriage escapement for holding said lock effective, a computing escapement under the control of said carriage escapement, and means for positively kicking off said latch by the operation of the computing escapement.

84. In a combined typewriting and computing machine, the combination with a computing machine escapement and a tooth for arresting it at the end of a computation, of keys for setting said tooth, a lock for said keys, a latch for said lock, and means for tripping said latch by the act of arresting the escapement by said tooth.

85. The combination with a traveling carriage and a shiftable platen therefor, of alphabet keys and numeral keys, a line-locking device for said keys, a connection operated by the numeral keys for making said line-locking device effective, and means for making said connection ineffective by the shifting of said platen.

86. The combination with a traveling carriage and a shiftable platen therefor, of alphabet keys and numeral keys, a line-locking device for said keys, a connection operated by the numeral keys for making said line-locking device effective, means for making said connection ineffective by the shifting of said platen, and manual means for making said connection ineffective.

87. The combination with a traveling carriage and a typewriter platen, of alphabet and numeral keys, a line-locking device for said keys, a case-shift device, a connection operated by the numeral keys for making said line-locking device effective, and means for making said connection ineffective by the operation of said case-shift.

88. The combination with a traveling carriage and a typewriter platen, of alphabet and numeral keys, a line-locking device for said keys, a case-shift device, a connection operated by the numeral keys for making said line-locking device effective, means for making said connection ineffective by the operation of said case-shift, and manual means for making said connection ineffective.

89. The combination with a typewriter mechanism including numeral keys and various other keys for operating the various parts of the typewriting mechanism, of a power-driven computing mechanism, connections including an escapement enabling the control of the action of said computing mechanism from said numeral keys, locking means for all of said keys, and releasing means controlled from said computing escapement, whereby untimely actuation of any of said various keys is prevented.

90. The combination with a computing mechanism, of a series of numeral keys for initiating digit by digit computing actions of said computing mechanism, and an automatic lock controlled from said computing mechanism for preventing the actuation of said numeral keys to initiate subsequent computations, until the digital computing action under way has been completed.

WALTER WRIGHT.
G. O. DEGENER.

Witnesses:
B. C. STICKNEY,
K. FRANKFORT.